United States Patent [19]
Maietta et al.

[11] Patent Number: 5,561,472
[45] Date of Patent: *Oct. 1, 1996

[54] VIDEO CONVERTER HAVING RELOCATABLE AND RESIZABLE WINDOWS

[75] Inventors: Michael Maietta, San Jose; David M. Smith, Campbell, both of Calif.

[73] Assignee: RasterOps Corporation, Santa Clara, Calif.

[ * ] Notice: The term of this patent shall not extend beyond the expiration date of Pat. No. 5,327,243.

[21] Appl. No.: 341,338

[22] Filed: Nov. 17, 1994

Related U.S. Application Data

[63] Continuation of Ser. No. 151,475, Nov. 12, 1993, abandoned, which is a continuation of Ser. No. 709,079, May 30, 1991, Pat. No. 5,327,243, which is a continuation of Ser. No. 446,038, Dec. 5, 1989, abandoned.

[51] Int. Cl.[6] .................................................. H04N 7/01
[52] U.S. Cl. .................................. 348/565; 348/588
[58] Field of Search .................................. 348/441, 443, 348/445, 448, 555, 556, 564, 565, 567, 586, 588, 596; 345/119, 120, 118, 115; H04N 5/907, 5/262, 5/265, 5/272, 5/275, 7/01

[56] References Cited

U.S. PATENT DOCUMENTS

| | | |
|---|---|---|
| 4,148,070 | 4/1979 | Taylor . |
| 4,218,710 | 8/1980 | Kashigi et al. . |
| 4,445,135 | 11/1984 | Heitmann et al. . |
| 4,528,636 | 7/1985 | Robinson, III . |
| 4,555,775 | 11/1985 | Pike . |

(List continued on next page.)

FOREIGN PATENT DOCUMENTS

| | | |
|---|---|---|
| 0067316 | 12/1982 | European Pat. Off. . |
| 3-175341 | 3/1986 | European Pat. Off. . |

OTHER PUBLICATIONS

Fernandez, A., et al., "A Raster Assembly Processor (RAP) for Integrated HDTV Display of Video and Image Windows," Globecom, Nov. 15–18, 1987, Tokyo, Japan, Sponsored by IEEE Communications Society, pp. 731–739.

Leonard, Eugene, "Considerations Regarding the Use of Digital Data to Generate Video Backrounds", SMPTE Journal, vol. 87, Aug. 1978, pp. 449–504.

IBM Technical Disclosure Bulletin, vol. 28, No. 6, Nov. 1, 1985, pp. 2615–2620; "Video Compatability Feature".

NEC Electronics document regarding the "µPD42101".

Antonio Fernandez, et al.; "VLSI Memory Management for an Eight Gigabit/s Memory System"; *SPIE Vo. 845 Visual Communications and Image Processing II* (1987) pp. 345–349.

Naoto Tanabe, et al.; "How To Build A Mixed Mode Terminal—Basic Concepts And An Example—"; *IEEE International Conference*; vol. 1 of 3; (1986); pp. 471–478.

S. Tsuruta, et al.; "Intelligent Communication Terminal for Integrating Voice, Data and Video Signals"; *IEEE International Conference*; vol. 3 of 3; (1986); pp. 1509–1513.

A. Fernandez, et al.; "A Raster Assembly Processor (RAP) For Integrated HDTV Display Of Video And Image Windows"; *IEEE*; Globecom Tokyo '87; (1987); pp. 19.5.1–19.5.9.

*Primary Examiner*—David E. Harvey
*Attorney, Agent, or Firm*—Skjerven, Morrill, MacPherson, Franklin & Friel; Norman R. Klivans

[57] ABSTRACT

A general purpose scan converter for converting video signals from one scan rate to another scan rate. The scan converter accepts NTSC, PAL, EGA, VGA, or other inputs in standard video formats and convert them to be displayed on a monitor. Several modes of operation including continuous frame grabbing, grab and hold image, and dynamic scaling are provided. In addition, window sizing and window location options are under user control. The input sources for video may be selected, and a robust voltage controlled oscillator is provided for timing. The converter device operates continuously in real time and provides a high resolution output signal to a monitor.

28 Claims, 57 Drawing Sheets

U.S. PATENT DOCUMENTS

| | | |
|---|---|---|
| 4,599,611 | 7/1986 | Bowker et al. . |
| 4,602,275 | 7/1986 | Smith et al. . |
| 4,622,545 | 11/1986 | Atkinson . |
| 4,641,255 | 2/1987 | Hohmann . |
| 4,696,674 | 10/1987 | Bloom . |
| 4,752,893 | 6/1988 | Guttag et al. . |
| 4,768,083 | 8/1988 | Romesburg . |
| 4,769,762 | 9/1988 | Tsujido . |
| 4,780,710 | 10/1988 | Tatsumi . |
| 4,783,648 | 11/1988 | Homma et al. . |
| 4,806,919 | 2/1989 | Nakayama et al. . |
| 4,814,884 | 3/1989 | Johnson et al. . |
| 4,827,253 | 5/1989 | Maltz . |
| 4,829,454 | 5/1989 | Kurakake et al. . |
| 4,855,813 | 8/1989 | Russel et al. . |
| 4,862,392 | 8/1989 | Steiner . |
| 4,866,524 | 9/1989 | Six . |
| 4,868,557 | 9/1989 | Perlman . |
| 4,876,600 | 10/1989 | Pietzsch et al. . |
| 4,890,257 | 12/1989 | Anthias et al. . |
| 4,907,086 | 3/1990 | Truong . |
| 4,908,700 | 3/1990 | Ishii et al. . |
| 4,935,815 | 6/1990 | Ichikawa . |
| 4,947,257 | 8/1990 | Fernandez et al. . |
| 4,961,071 | 10/1990 | Krooss ................................. 345/119 |
| 4,982,343 | 1/1991 | Hourvitz et al. . |
| 4,984,183 | 1/1991 | Ohuchi . |
| 4,994,912 | 2/1991 | Lumelsky . |
| 4,994,914 | 2/1991 | Wiseman . |
| 5,043,714 | 8/1991 | Perlman . |
| 5,065,143 | 11/1991 | Greaves et al. . |
| 5,065,231 | 11/1991 | Greaves et al. . |
| 5,146,556 | 9/1992 | Hullot et al. . |
| 5,157,764 | 10/1992 | Priem et al. . |
| 5,327,243 | 7/1994 | Maietta et al. ........................ 348/565 |

```
/*
** tv_on.c:  Program to display live video signal on 386i desktop
**
**          Copyright 1989, RasterOps Inc.
*/ include <sys/types.h>              /* Standard data types. */
include <stdio.h>                  /* Standard system i/o definitions. */
include <pixrect/pixrect_hs.h>     /* Pixrect information #### */ include <sundev/tc1reg.h>          /* Information on the RasterOps TC1. */
include "multimedia.h"            /* Macros for stuff we do often. */

/* Global storage associated with memory mapped version of 386i/TC. */

Tc1_Device_Map *device_map;         /* Memory mapping of TC1's device registers. */
long           *monochrome;         /* Monochrome frame buffer location. */
long           *selection;          /* Selection memory location. */
long           *true_color;         /* True color frame buffer location. */
Pixrect        *tc1;                /* Raw pixrect to use until fix Sunwindows. */

/*"main"
*
* Purpose:
*       Execution point for live tv demonstration program.
*
```

Fig. 3a-1

```
* Parameters:
*    argc   =    number of arguments passed from command invocation
*    argv   ->   vector of addresses of arguments:
*                -c999    column position where 999 is column (0 - 1151)
*                -r999    row position where 999 is row (0-899)
*                -s99     size of video image where 99 is value 0 - 15
*                -v9      type of video being displayed (0-3)
*
* Notes:
*    (1) Default values are c=830 r=655 s=15 v=0
*/
main(argc, argv)
    int     argc;
    char    **argv;
{
    int     column;         /* Column to display image at. */
    int     i_arg;          /* Loop index: command argument now processing. */
    int     row;            /* Row for image. */
    int     scale;          /* Scale for image. */
    int     video_on;       /* Needed by START_PIP macro. */
    int     video_type;     /* Type of video being displayed. */

/*
 * For the present time, use a raw pixrect for display, until we get a version
 * of Sunwindows which knows about 24-bit mode.
 */
```

Fig. 3a-2

```
if ( (tc1 = pr_open("/dev/fb")) == 0)
{
    printf(" *** Unable to open pixrect for /dev/fb\n");
    exit(2);
}
if ( mmap_tcone("/dev/tcone0", &monochrome, &selection, &true_color, &device_map)
{
    printf(" *** Unable to map /dev/tcone0\n");
    return 0;
}
/* Process command arguments. */
for (column=830,row=655,scale=15,video_type+0, i_arg=1; i_arg < argc; i_arg++)
{
    if (argv[i_arg][0] != '+' '-')
    {
        printf(" *** Unknown argument '%s' being ignored\n", argv[i_arg]);
        printf(" Usage: tvon [-c1111] [-r222] [-s33]\n");
        printf(" where -c1111 is the column specification the 111 is a number in column);
        printf("       -r222  is the row specification, the 222 is a number in row);
        printf("       -s33   is the scale specification, the 33 is a number in scale);
    { int s;
        for (s = 0; s < 16; s++)
        {
            if (s%4 == 0) printf("\n        ");
            printf ("%d - %dx%d       ", s, VIDEO_WIDTH(s), VIDEO_HEIGHT(s));
        }
    }
}
```

Fig. 3b-1

```
        }
        return;
    }
    else if (argv[i_arg][1] == 'c')
    {
        sscanf(&argv[i_arg][2], "%d", &column);
    }
    else if (argv[i_arg][1] == 'r')
    {
        sscanf(&argv[i_arg][2], "%d", &row);
    }
    else if (argv[i_arg][1] == 's')
    {
        sscanf(&argv[i_arg][2], "%d", &scale);
    }
    else if (argv[i_arg][1] == 'v')
    {
        sscanf(&argv[i_arg][2], "%d", &video_type);
    }
}
/* Clean the screen in case there was an image being shown in another incarnation */
SET_GROUP(PIXPG_OVERLAY_ENABLE);
pr_rop(tcl, 0, 0, 1152, 900, PIX_SRC | PIX_COLOR(1), 0, 0, 0);
```

Fig. 3b-2

```
/*  Position video image, start it up, and clear the area so that it is visible.  */ video_on = 0;
POSITION_PIP(column, row);
START_PIP(video_type, scale, scale);
SHOW_VIDEO(0, column, row, VIDEO_WIDTH(scale), VIDEO_HEIGHT(scale));
```

Fig. 3c

```
/*   @(#)tc1reg.h        1.5 of 5/31/89, SMI */

/* Board layout of RasterOps sierra 24-bit frame buffer for the 386i */ ifndef tc1reg_INCLUDED
define tc1reg_INCLUDED ifdef TC1REG_DEBUG
include <sys/types.h>
#include <stdio.h>
#include <pixrect/pixrect.h>
endif TC1REG_DEBUG include <machine/param.h>

/*
 * These are the physical addresses on the Sun 386i P2 bus for the
 * components of the Sierra board.  The "mmap" system call is used
 * to map the frame buffer components into virtual memory.  Within
 * the virtual memory space the frame buffers appear in the same order
 * as they do in physical memory, with the same spacing.
 */
#define TC1_P2_SLOT_4_ADDR      0xF7000000   /* Id register for P2 bus slot 4. */
#define TC1_DEVICE_MAP_ADDR     0xA0000000   /* Device control and status registers. */
#define TC1_CONFIG_ADDR         0xA0200000   /* Address of device in "config" description. */
```

Fig. 3d-1

```
#define TC1_OVERLAY_ADDR        0xA0200000      /* Monochrome overlay (looks like BW2). */
#define TC1_SELECTION_ADDR      0xA0300000      /* Selection memory (1 = 24-bit, 0 = 1-bit). */
#define TC1_TRUE_COLOR_ADDR     0xA0400000      /* 24-bit true color. */

/*- Resolution values for P2 Bus slot 4. */ define TC1_HRID 0x82           /* We masquerade as a 1152 x 900 BW2 card. */

/* Size constants used to generate other constants in this file. */ define TC1_WIDTH       1152    /* Standard width in pixels of frame buffers. */
define TC1_HEIGHT      900     /* Standard height in pixels of frame buffers. */
#define PIXEL_SIZE      4       /* # of bytes per pixel in 24-bit frame buffer */
#define BITPERBYTE      8       /* # of bits per byte. */

/* Frame buffer size information. */ define TCSCAN_SIZE (TC1_WIDTH * PIXEL_SIZE)        /* Size of 1 scan line in 24-bit buffer */
define OVSCAN_SIZE (TC1_WIDTH / BITPERBYTE)        /* Size of 1 scan line in 1-bit buffer */ define TC1_TRUE_COLOR_SIZE  (TCSCAN_SIZE * TC1_HEIGHT)     /* 24-bit screen memory size. */
define TC1_OVERLAY_SIZE     (OVSCAN_SIZE * TC1_HEIGHT)     /* Monochrome screen memory size. */
#define TC1_SELECTION_SIZE   (OVSCAN_SIZE * TC1_HEIGHT)     /* Selection memory size. */
#define TC1_OMAP_SIZE        4                              /* Monochrome lookup table size. */
#define TC1_CMAP_SIZE        256                            /* 24-bit lookup table sizes. */
#define TC1_RAMDAC_CMAPSIZE TC1_CMAP_SIZE                   /* Alias used by pixrect code. */
```

Fig. 3d-2

```
#define TC1_PROBESIZE TC1_OVERLAY_SIZE

/*-
 *      offsets of 3 frame buffers in virtual space of users.  This information is used by
 *      tconemmap to make the 3 frame buffers appear contiguous to process which map
 *      them in.
 */ define TC1_OVERLAY_OFFSET         0
define TC1_SELECTION_OFFSET       TC1_OVERLAY_OFFSET+ROUNDUP(TC1_OVERLAY_SIZE, NBPG)
#define TC1_TRUE_COLOR_OFFSET      TC1_SELECTION_OFFSET+ROUNDUP(TC1_SELECTION_SIZE, NBPG)
#define TC1_DEVICE_MAP_OFFSET      TC1_TRUE_COLOR_OFFSET+ROUNDUP(TC1_TRUE_COLOR_SIZE, NBPG)

/*
 *      Layout of device registers associated with the card.  These are memory mapped in by
 *      the tcone_probe routine.
 */
typedef struct {
        u_long  control;                /* Frame buffer control register (overall operations). */
        u_long  status;                 /* Frame buffer status register (overall operations). */
        u_long  filler[6];              /* Unused. */ u_long  duart_b_control;        /* DUART port b (mouse) control register. */
        u_long  duart_b_data;           /* DUART port b (mouse) data register. */ u_long  duart_a_control;        /* DUART port a (keyboard) control register. */
        u_long  duart_a_data;           /* DUART port a (keyboard) data register. */
```

Fig. 3e-1

```
    u_long  rgb_address;        /* All 3 RAMDACs' address registers as a long word. */
    u_long  rgb_color;          /* All 3 RAMDACs' color value registers as a long word. */
    u_long  rgb_control;        /* All 3 RAMDACs' control registers as a long word. */
    u_long  rgb_overlay;        /* All 3 RAMDACs' overlay value registers as a long word. */ u_long  red_address;        /* Red gun RAMDAC's address register (low-order byte). */
    u_long  red_color;          /* Red gun RAMDAC's color value register (low-order byte). */
    u_long  red_control;        /* Red gun RAMDAC's control register (low-order byte). */
    u_long  red_overlay;        /* Red gun RAMDAC's overlay value register (low-order byte). */ u_long  green_address;      /* Green gun RAMDAC's address register (low-order byte). */
    u_long  green_color;        /* Green gun RAMDAC's color value register (low-order byte). */
    u_long  green_control;      /* Green gun RAMDAC's control register (low-order byte). */
    u_long  green_overlay;      /* Green gun RAMDAC's overlay value register (low-order byte). */ u_long  blue_address;       /* Blue gun RAMDAC's address register (low-order byte). */
    u_long  blue_color;         /* Blue gun RAMDAC's color value register (low-order byte). */
    u_long  blue_control;       /* Blue gun RAMDAC's control register (low-order byte). */
    u_long  blue_overlay;       /* Blue gun RAMDAC's overlay value register (low-order byte). */ u_long  video_control;      /* PIP live video control register. */
    u_long  video_position;     /* PIP live video screen position. */
} Tc1_Device_Map;

#define TC1_DEVICE_MAP_SIZE sizeof(TTc1_Device_Map)
```

Fig. 3e-2

```c
/*-
 *   Register "addresses" for Brooktree internal registers.  These are written to the
 *   address register (xxx_address) to select the internal register to be accessed by
 *   reads or writes to the control register (xxx_control).
 */
#define BROOKTREE_BLINK_MASK    5    /* Blink mask register. */
#define BROOKTREE_COMMAND       6    /* Command register. */
#define BROOKTREE_CONTROL       7    /* Control / test register. */
#define BROOKTREE_READ_MASK     4    /* Read mask register. */

/*-
 *   Picture-In-a-Picture (PIP) live video option card register definitions.  The
 *   PIP is addressed throught the TC1, and has its registers mapped at the end of
 *   the TC1's device map.
 */
define PIP_PRESENT 0x100          /* status value: PIP present (this is a TC1 board reg.) */ define PIP_VERTICAL_SYNC   0x400  /* video_control value: PIP vertical sync. (goes low). */
define PIP_SOURCE_PRESENT  0x100  /* video_control value: video source connected. */ define PIP_POSITION(col,row)                 /* video_position value: Macro to calculate linear address. */ \
    ( ((row)*1152) + (col) )

#define PIP_START(svideo, w, h)  /* video_control value: Turn on live video display. */ \
    (svideo) | 4 | ( (w || h ) ? ( ((h-1)<<20) | ((w-1)<<16) | 0x08) : 0)

define PIP_STOP(svideo) (svideo) /* video_control value: Turn off live video display. */ endif tc1reg_INCLUDED
```

Fig. 3f

```
/*
 *   Macros used to perform various operations on the frame buffer
 *   and live video.
 */
#define WAIT_PIP_VERTICAL_RETRACE /* Wait for the picture in a picture's vertical return. */ \
{\
    /*####int status;\
    for(;;)\
    {\
        status = device_map->video_control;\
        if ((status & PIP_SOURCE_PRESENT) == 0) \
            break;\
        if ( (status & PIP_VERTICAL_SYNC) == 0) \
            break;\
    } \ /*####*/ \
} define WAIT_ONE_PIP_REFRESH \
{\
    set_timeout(&video_refresh_time);\
    wait_timeout();\
}
```

Fig. 3g-1

```
#define START_PIP(sv,w,h)                                      /* Start the picture in a picture option. */\
{\
    video_on = 1;\
    WAIT_PIP_VERTICAL_RETRACE;\
    device_map->video_control = 0x04 | sv |\
        ( (w) ? ( ((h-1)<<20) | ((w-1)<<16) | 0x08) : 0 );\
} define STOP_PIP                                               /* Stop the picture in a picture option. */\
{\
    video_on = 0;\
    WAIT_PIP_VERTICAL_RETRACE;\
    device_map->video_control = device_map->video_control & ~4;\
    WAIT_ONE_PIP_REFRESH;\
} define POSITION_PIP(left,top)                                 /* Position the picture in a picture option. */\
{\
    WAIT_PIP_VERTICAL_RETRACE;\
    device_map->video_position = PIP_POSITION((left), (top));\
} define SET_GROUP(group)                                       /* Select the plane group to access. */\
{\
    int planes = PIX_GROUP(group) | (group==PIXPG_24BIT_COLOR ? 0x00ffffff : 0);\
    pr_putattributes(tc1, &planes);\
} define CLEAN_SCREEN                                           /* Clean up screen */\
```

Fig. 3g-2

```
{\
    SET_GROUP(PIXPG_OVERLAY);\
    pr_rop(tcl, 25, 50, 1110, 840, PIX_SRC | PIX_COLOR(0), 0, 0, 0);\
    SET_GROUP(PIXPG_OVERLAY_ENABLE);\
    pr_rop(tcl, 25, 50, 1110, 840, PIX_SRC | PIX_COLOR(1), 0, 0, 0);\
}

/* Remove data from an area of the overlay memory. */ define CLEAN_FRAME(margin, left, top, width, height) \
{\
    SET_GROUP(PIXPG_OVERLAY_ENABLE);\
    pr_rop(tcl, left, top, width, height, PIX_SRC | PIX_COLOR(1), 0, 0, 0);\
    if (margin !=0) \
    {\
        SET_GROUP(PIXPG_OVERLAY);\
        pr_rop(tcl, left-margin, top-margin, width+2*margin, margin+4, PIX_SRC | PIX_COLOR(1);\
        pr_rop(tcl, left+width-4, top-margin, margin+4,       height+2*margin, PIX_SRC | PIX_COLOR(1);\
        pr_rop(tcl, left-margin, top+height-4, width+2*margin, margin+4, PIX_SRC | PIX_COLOR(1));\
        pr_rop(tcl, left-margin, top-margin, margin+4,       height+2*margin, PIX_SRC);\
    }\
}

/* Draw a frame around an area of the screen and expose the 24 bit portion as an image. */
```

Fig. 3h-1

```
#define SHOW_IMAGE(margin, left, top, width, height) \
{ \
    SET_GROUP(PIXPG_OVERLAY_ENABLE); \
    pr_rop(tcl, left, top, width, height, PIX_SRC | PIX_COLOR(0), 0, 0, 0); \
    if (margin != 0) \
    { \
        SET_GROUP(PIXPG_OVERLAY); \
        pr_rop(tcl, left-margin,      top-margin,   width+2*margin, margin,         PIX_SRC | PIX_COLOR(0)); \
        pr_rop(tcl, left-width,       top-margin,   margin,         height+2*margin, PIX_SRC); \
        pr_rop(tcl, left-margin,      top+height,   width+2*margin, margin,         PIX_SRC | PIX_COLOR(0)); \
        pr_rop(tcl, left-margin,      top-margin,   margin,         height+2*margin, PIX_SRC); \
    } \
}
/* Draw a frame around an area of the screen and expose the 24 bit portion as a live video. */
#define SHOW_VIDEO(margin, left, top, width, height) \
{ \
    SET_GROUP(PIXPG_OVERLAY_ENABLE); \
    pr_rop(tcl, left+4, top+4, width-8, height-8, PIX_SRC | PIX_COLOR(0), 0, 0, 0); \
    if (margin != 0) \
    { \
        SET_GROUP(PIXPG_OVERLAY); \
        pr_rop(tcl, left-margin+4,    top-margin+4, width+2*margin-8, margin,           PIX_SRC |
               PIX_COLOR(0)); \
        pr_rop(tcl, left+width-4,     top-margin+4, margin,           height+2*margin-8, PIX_SRC; \
        pr_rop(tcl, left-margin+4,    top+height-4, width+2*margin-8, margin,           PIX_SRC |
               PIX_COLOR(0)); \
        pr_rop(tcl, left-margin+4,    top-margin+4, margin,           height+2*margin-8, PIX_SRC); \
    } \
}
```

/* Calculate number of pixels for a given video reduction. */ define VIDEO_WIDTH(scale)  ( (scale) ? (int) (640. * (16.0 - (scale)) / (17.0 - (scale)))
define VIDEO_HEIGHT(scale) ( (scale) ? (int) (480. * (16.0 - (scale)) / (17.0 - (scale)))

| D7 | | | | | | | D0 |
|---|---|---|---|---|---|---|---|
| SDA | SCL | X | X | FS | START | VS1 | VS0 |

FIG. 5

| D7 | | | | | | | D0 |
|---|---|---|---|---|---|---|---|
| 0 | 0 | 0 | 0 | 0 | VSYNC | SCLO | IDC |

FIG. 6

| D7 | | | | | | | D0 |
|---|---|---|---|---|---|---|---|
| YS3 | YS2 | YS1 | YS0 | XS3 | XS2 | XS1 | XS0 |

FIG. 7

| D7 | | | | | | | D0 |
|---|---|---|---|---|---|---|---|
| XY07 | XY06 | XY05 | XY04 | XY03 | XY02 | XY01 | XY00 |

| D7 | | | | | | | D0 |
|---|---|---|---|---|---|---|---|
| XY15 | XY14 | XY13 | XY12 | XY11 | XY10 | XY09 | XY08 |

| D7 | | | | | | | D0 |
|---|---|---|---|---|---|---|---|
| XY23 | XY22 | XY21 | XY20 | XY19 | XY18 | XY17 | XY16 |

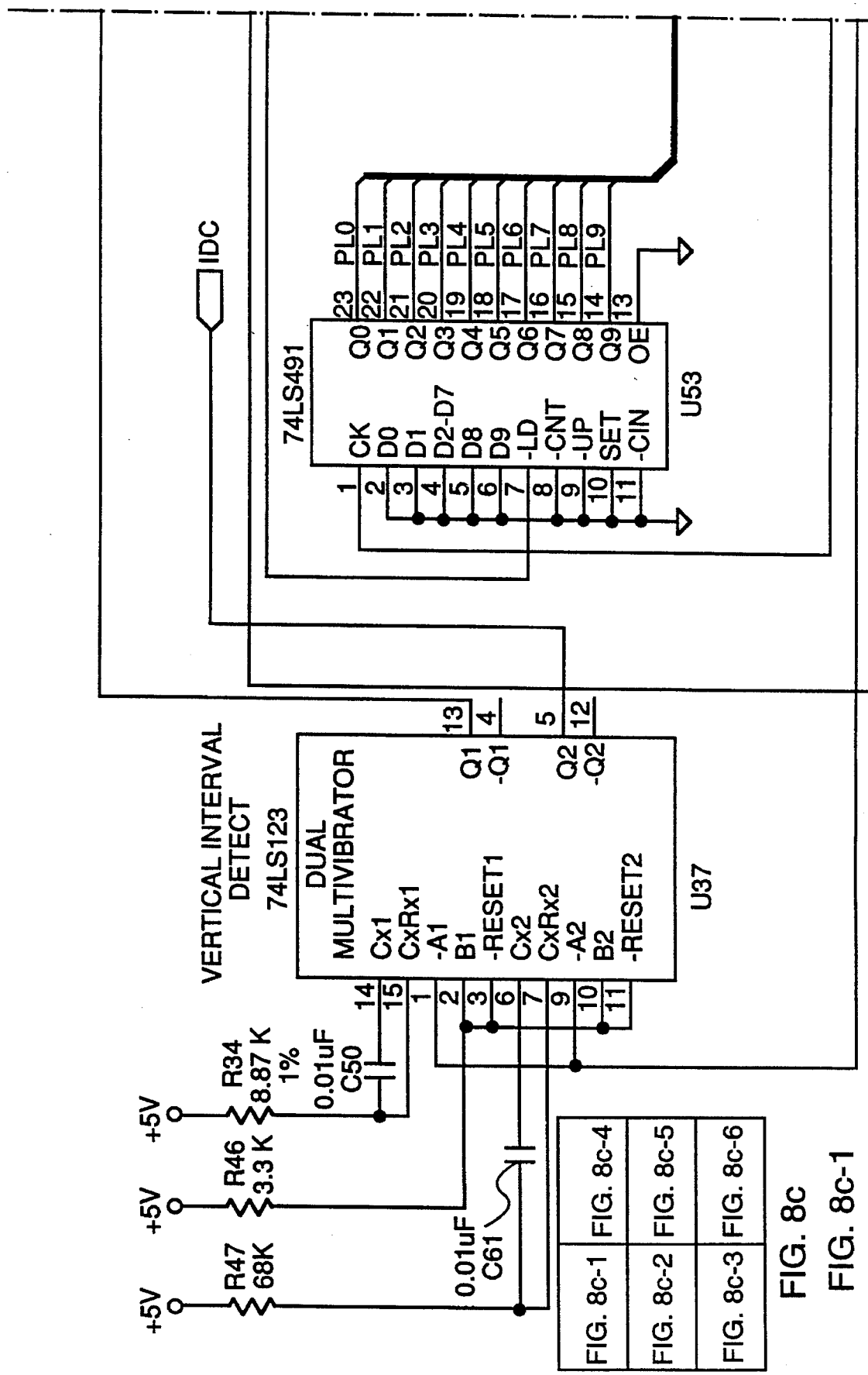

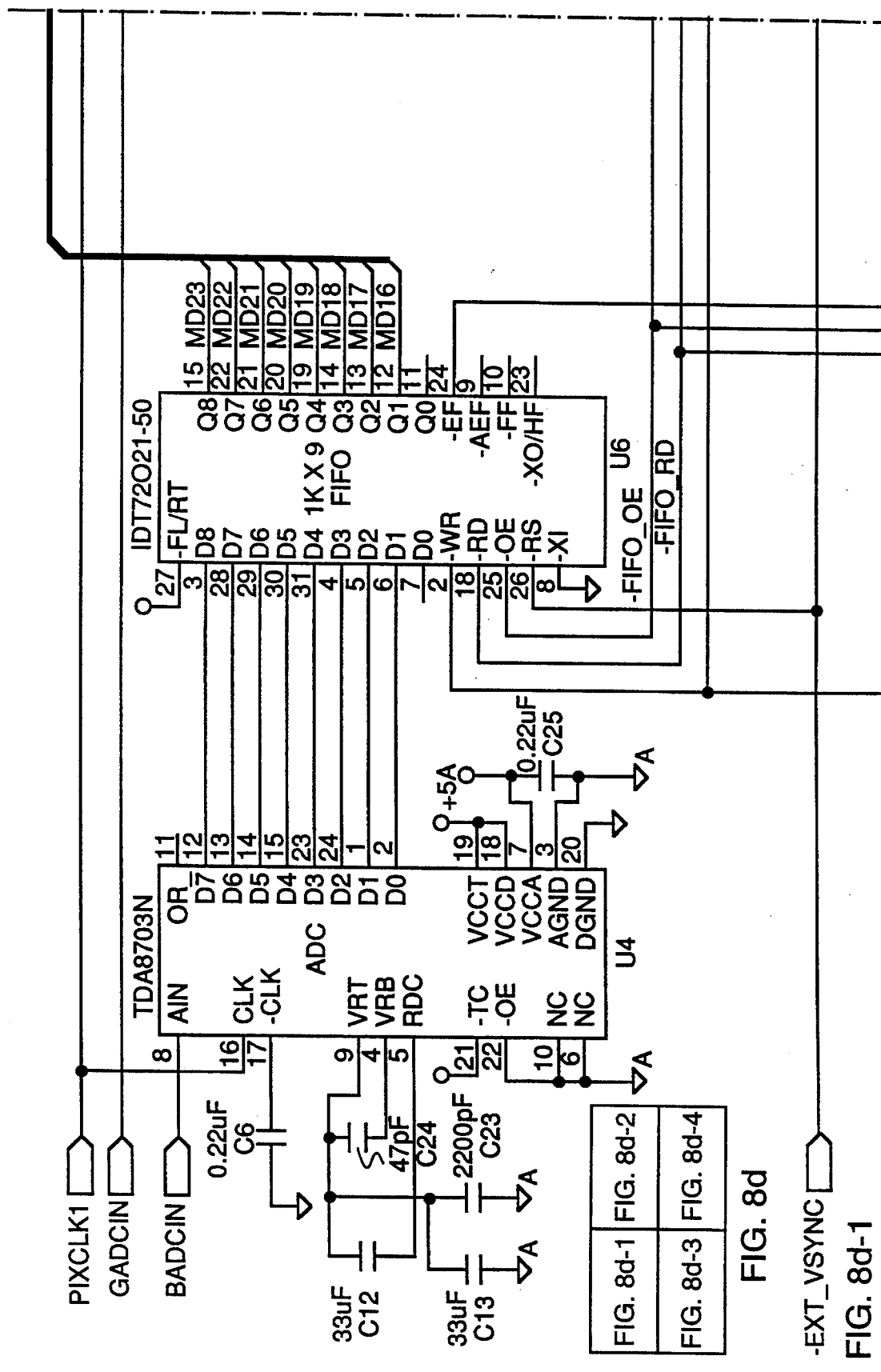

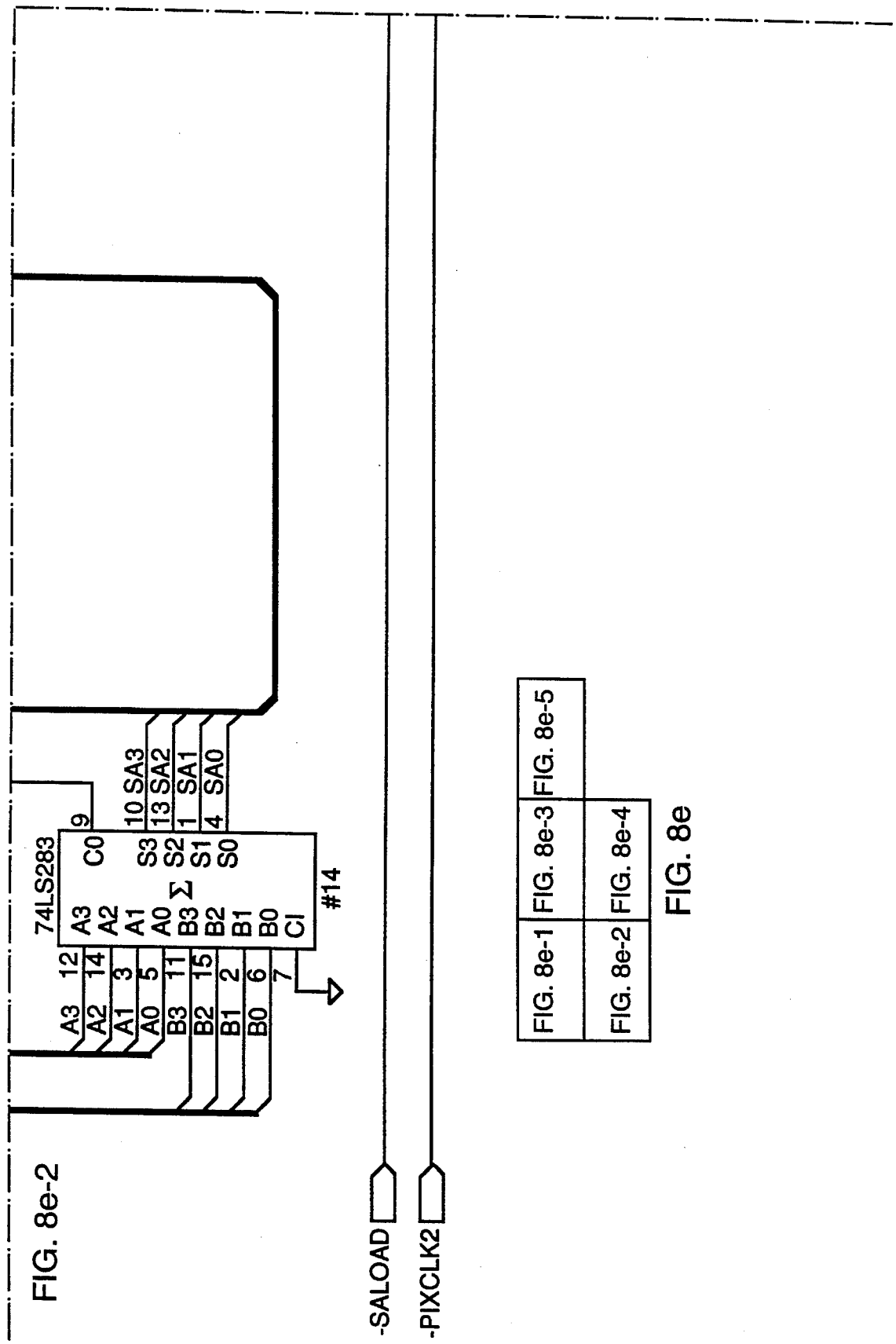

| FIG. 8g-1 | FIG. 8g-2 |
| --- | --- |
| FIG. 8g-3 | FIG. 8g-4 |

VIDEO CONVERTER HAVING RELOCATABLE AND RESIZABLE WINDOWS

CROSS REFERENCE TO RELATED APPLICATIONS

This application is a continuation of application Ser. No. 08/151,475 filed Nov. 12, 1993, abandoned, which is a continuation of application Ser. No. 07/709,079 filed May 30, 1991 now U.S. Pat. No. 5,327,243, which is a continuation of U.S. patent application Ser. No. 07/446,038 filed Dec. 5, 1989, abandoned.

BACKGROUND OF THE INVENTION

1. Field of the Invention

This invention relates to a video signal converter. More specifically, the invention relates to a general purpose scan converter for accepting video input signals and converting them to be displayed on a video monitor having a different scan rate.

2. Description of the Prior Art

Various types of video converters are known in the art. In a typical video converter, a video input signal is provided at a certain scan rate and a processor in the video converter transfers the incoming video data to a converter. The converter provides the information converted into digital form to a monitor to be displayed on the monitor at a different scan rate. Typically the conversion is not in real time because the conversion is performed by first converting all of the red components of the video signal, then converting all of the green components, and then finally converting all the blue components. This type of scan conversion is relatively inexpensive to implement but is very slow.

In another type of video converter called a Time Base Corrector (TBC), the video signal is stored in analog form using charge coupled device (CCD) circuitry. Thus, the entire incoming frame is stored at a real time rate. The output of the CCD is shifted at a different rate, thus providing scan conversion. In another type of video converter, the incoming video data is taken by components (usually only the black and the white components or colored components) at a reduced resolution or reduced color grade. The data is transferred in a mode conventionally referred to as burst mode, which allows the input circuitry to transfer the information through a system data bus to the video circuitry. This type of scan converter has some general purpose applications because it allows transfer to almost any sort of circuitry. It has the disadvantage that software in the scan converter device must know the hardware memory locations. Typically the resolution provided by this system is very poor and relatively small amounts of information can be transferred in real time.

Another type of converter is a video card that can store a video frame at one rate, then, through the use of an expensive multiscan monitor, output the stored video frame at a non-interlaced rate. Another disadvantage is that the video card must continuously be programmed to go between the two scan rates. This converter also does not provide a real time display.

Thus, in the prior art there is no true real time video conversion available that provides a digital output signal for use by a host computer and to be displayed on a video monitor of a different scan rate, i.e., going from interlaced video to non-interlaced. There are no prior art high resolution and high speed video converters available for use in a computer video system which requires digital output data from the converter.

SUMMARY OF THE INVENTION

In accordance with the invention, a general purpose video scan converter is provided that accepts NTSC, PAL, EGA, VGA, or other standard video inputs typically in RGBS, S-video, or composite form and converts these video inputs so as to display them and superimpose them as a window on a non-interlaced video monitor. In accordance with the invention, the upscan rate is dependent on the frame buffer resolution. (An upscan converter accepts video of a low scan frequency and displays it on a high scan rate monitor without the loss of video information.) Several modes of operation are provided including continuous frame grabbing, single frame grabbing (i.e., grab and hold image), and dynamic scaling. Each of these modes allows window sizing and location of the window in the video screen to be under user control.

The device provided in accordance with the invention is advantageously a real time video converter providing high resolution images. In accordance with the invention, an incoming video signal is accepted by the device at a given rate and after conversion is displayed in real time on a monitor typically having a different resolution and a different scan rate than that of the incoming signal. In accordance with one embodiment of the invention, each picture element (pixel), is represented by 24 bits. Thus, eight bits are provided in the video signal for each of the three primary video colors. This provides 256 ($2^8$) intensity levels for each video color component. Thus, each pixel can be any one of up to 16,777,216 colors, i.e., $256^3$.

As is known in the art, S-video is an emerging standard which is used on commercially available medium grade video tape recorders in order to improve the quality of the image shown on television. S-video is a two wire standard involving chrominance and luminance. Also as is known in the art, a typical television set is an interlaced monitor in which each picture is drawn so that at one pass of the screen all of the odd lines are drawn, and then in a second pass the even lines are drawn on the screen. Thus, it takes two fields, i.e., passes, to complete an entire frame. Non-interlaced monitors are conventionally high resolution monitors in which the entire picture is drawn in one complete pass, thus removing the artifact of screen refresh called flicker. Also, as is known in the art, continuous frame grabbing is the process of continuously converting incoming information and displaying it on a non-interlaced monitor. Continuous refers to the fact that this process occurs in real time, as in typical broadcast television. Single-frame grab and hold means taking one frame at a time or looking at a view of several frames and freezing that particular frame or frames. Typically, this is done in order to store a particular frame in a computer memory device such as a disk drive. This process is useful in tape editing or frame editing and for animation. Dynamic scaling refers to the process by which a full size screen image is displayed in a reduced size.

In accordance with the invention, a video image is first converted to digital data form, and then the digital data is provided to a pixel buffer. The digital video data is written into the pixel buffer via control lines at a rate that is synchronous with the incoming video data. A control sequencer provides a write pulse to the pixel buffer which begins filling the pixel buffer. The control sequencer also controls the rate at which the data is read out of the pixel buffer. As data is extracted out of the pixel buffer, the control sequencer simultaneously toggles a frame buffer control line and writes the pixel buffer data into a frame buffer via a frame buffer data bus. A host processor can at any time change the screen position of the converted video by loading a different start address into an address generator. The host can also start and stop the conversion as well as dynamically scale the window size of the converted video image. The frame buffer provides the converted video signal to a monitor and/or to a digital memory device such as conventionally provided in a computer.

BRIEF DESCRIPTION OF THE DRAWINGS

FIGS. 3a to 3i show a computer program in accordance with the invention.

FIGS. 4–7 depict registers in accordance with the embodiment of FIG. 2.

DETAILED DESCRIPTION OF THE DRAWINGS

Figure 1:
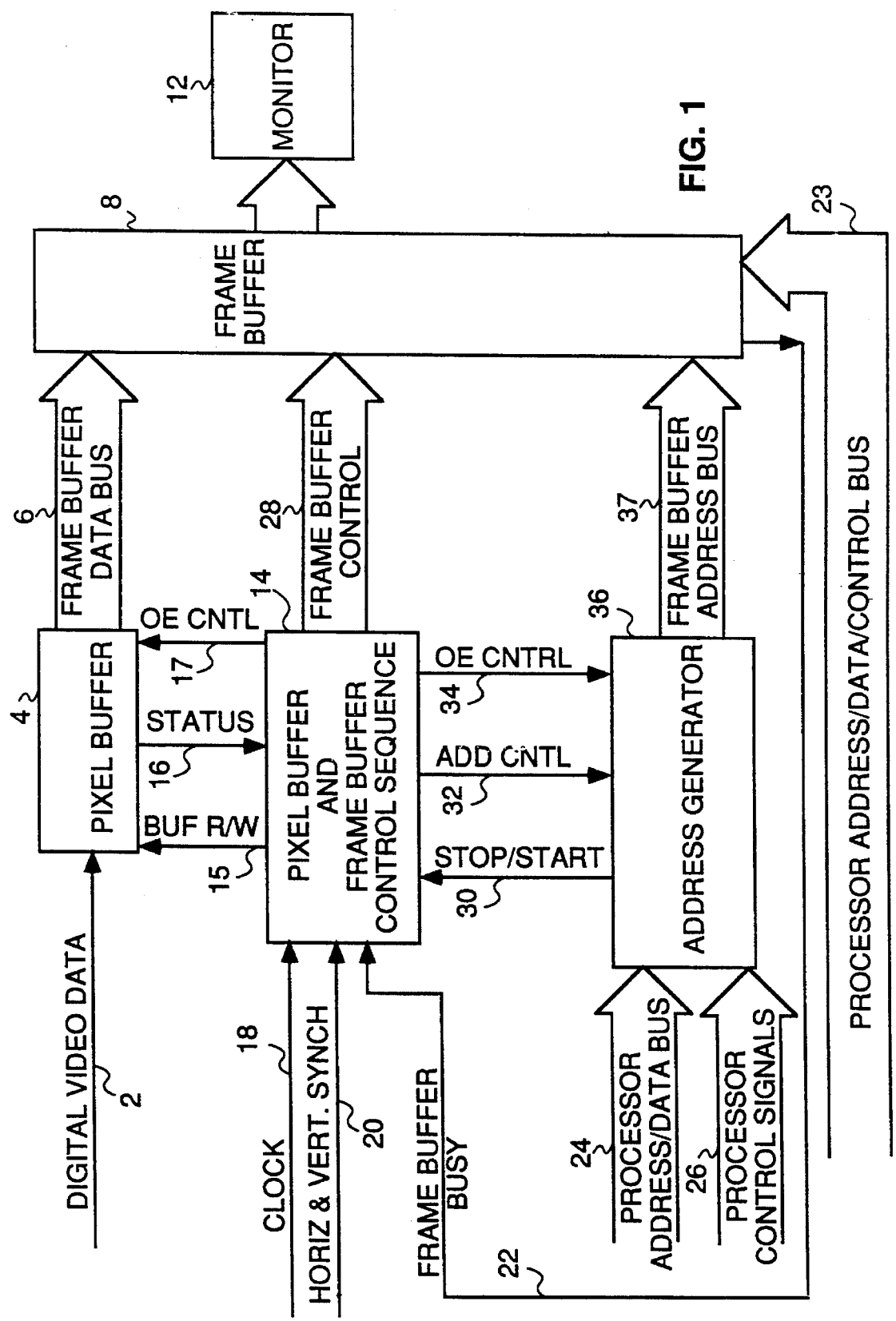
FIG. 1 depicts one embodiment of the invention in block diagram form.

FIG. 1 depicts in a block diagram a converter in one embodiment of the invention. As shown, digital video data, i.e., data which has already been converted to digital form from a host or from the conventional video analog signal format, is provided on line 2 to a pixel buffer 4. The pixel buffer 4 in turn provides the data on frame buffer data bus 6 to a conventional frame buffer 8. Frame buffer 8 includes the elements of what is conventionally termed a "dumb" frame buffer, i.e., having no built-in intelligence. Frame buffer 8 thus conventionally includes (not shown) conventional video RAM (VRAM), a conventional video RAM controller and digital-to-analog output converters. Also included in frame buffer 8 is timing circuitry to link these elements together, and to display the contents of the VRAM on a monitor 12.

Thus the data is written into video RAM in frame buffer 8, the outputs of the video RAM are provided to conventional digital-to-analog converters (not shown) in frame buffer 8, and the output of the conventional digital analog converters is provided to video monitor 12 to display the image. Thus, the output of frame buffer 8 continuously refreshes the screen of monitor 12 with the data stored in the video RAM. Pixel buffer 4 preferably includes enough storage capacity to hold several pixels (in one embodiment 64 pixels) of video digital data information. The status of data (i.e., whether or not there is data in pixel buffer 4 that can be written to frame buffer 8) in pixel buffer 8 in turn is provided to a pixel and frame buffer control sequencer 14 on a status line 16. Control sequencer 14 is provided with timing signals in the form preferably of a clock signal 18 and a horizontal and vertical synchronization signal 20. Also provided to Control sequencer 14 is a frame buffer busy status signal 22 from frame buffer 8 indicating whether frame buffer 8 is busy or not.

Pixel buffer 14 preferably can contain (but is not restricted to) 24 bits per pixel of digitized video data. The output of pixel buffer 14 to frame buffer data bus 6 preferably includes eight bits each of red, green, and blue data. The red channel (not shown) is preferably the least significant byte and is on data bits 0 to 7. The green channel (not shown) is preferably on data bits 8 to 15 and the blue channel (not shown) is on data bits 16 to 23. Data bits 24 to 31 are typically not used.

The host processor can also directly access VRAM in frame buffer 8 by providing signals on processor address/data/control bus 23 to frame buffer 8 while the scan conversion is in progress. This multi-tasking feature allows scan conversion to co-exist with direct host access to frame buffer 8, and has several modes of operation. These various modes allow the user to select how much time frame buffer 8 is to allocate to scan conversion versus host access (i.e., in one embodiment the modes are that scan conversion is in effect 95%, 50%, 30%, or 20% of the time, with direct host access the rest of the time).

The multi-tasking feature is achieved by latching (holding) the processor address, data, and control signals on bus 23 during a host-to-frame buffer 8 access. The host is then held off for a period of time, typically 20 μsec. Frame buffer 8 then asserts the frame buffer busy signal on line 22 and the host transaction then takes place. During the actual transaction period, pixel buffer 4 begins to back up with data. This is not a problem because during video blanking pixel buffer 4 has ample time to empty.

If 50% or less is selected for the proportion of time devoted to the scan conversion, the converter operates at a reduced rate (non-real time) i.e, every other frame is converted. This allows longer periods of time when the host processor has full control of frame buffer 8.

The operation of the converter is halted by clearing (setting to zero) a start bit which is located in a control register of control sequencer 14, as further described below. Control sequencer 14 issues commands to frame buffer 8 on frame buffer control lines 28. These control lines 28 generate the VRAM timing that is required in order to write the pixel buffer 4 data into VRAM.

The control sequencer 14 is normally in an IDLE state. When the start bit is set to one, control sequencer 14 controls all aspects of the pixel buffer 4 using buffer read/write line 15, status line 16, and output enable (OE) control line 17. During a frame buffer screen refresh/transfer cycle, the frame buffer busy bit (on line 22) will go to the value of one. This alerts control sequencer 14 and causes control sequencer 14 to temporarily shut down, i.e., go into a tri-state condition, and thus all output signals 6, 28, and 37 are in an inactive state. This allows the processor to regain control of frame buffer 8 at this time.

Figures 1, 8A:
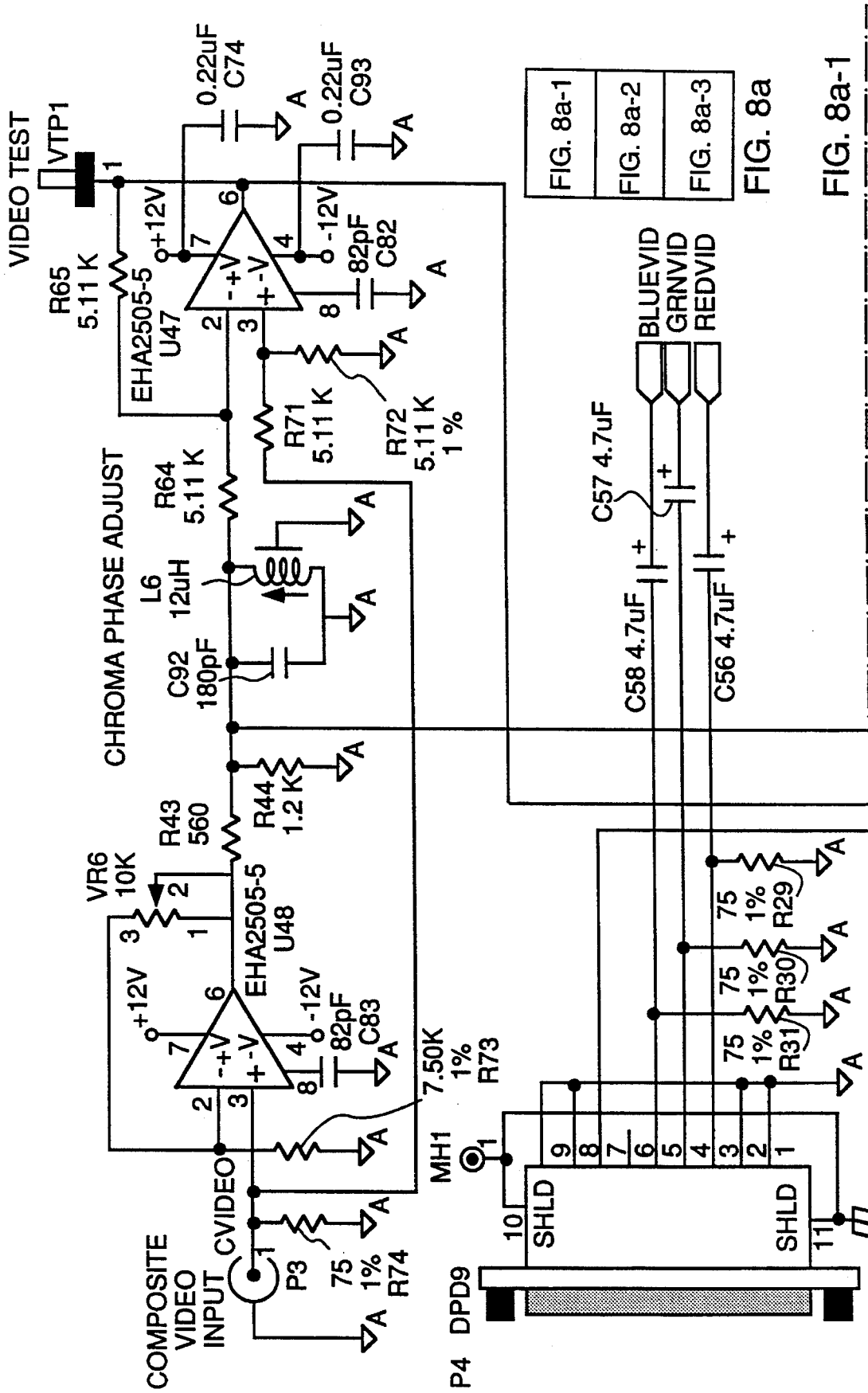
FIGS. 8a–8i show schematically the embodiment of FIG. 2.
Figures 2, 8A:
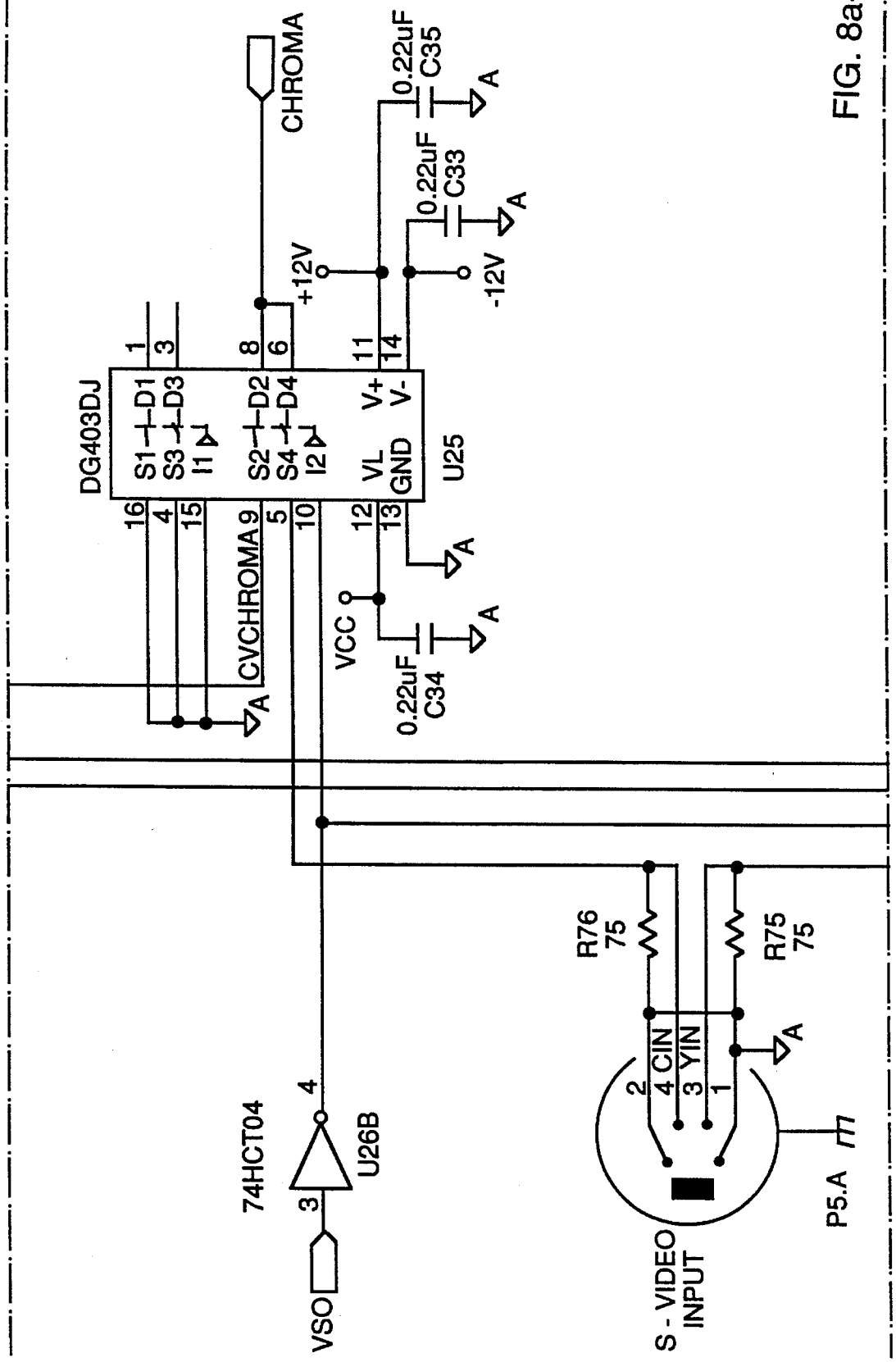
Figures 3, 8A:
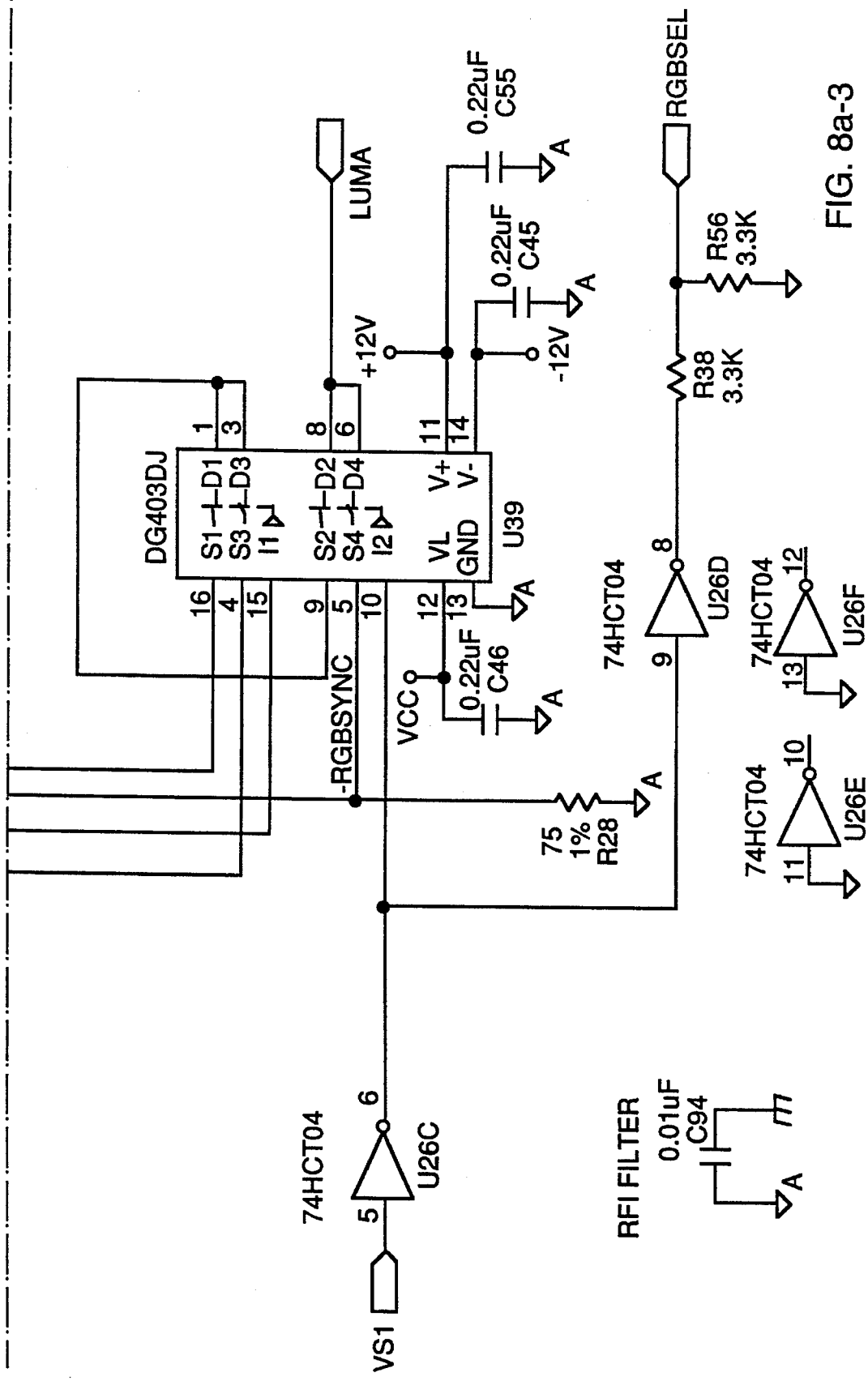
Figures 1, 8B:
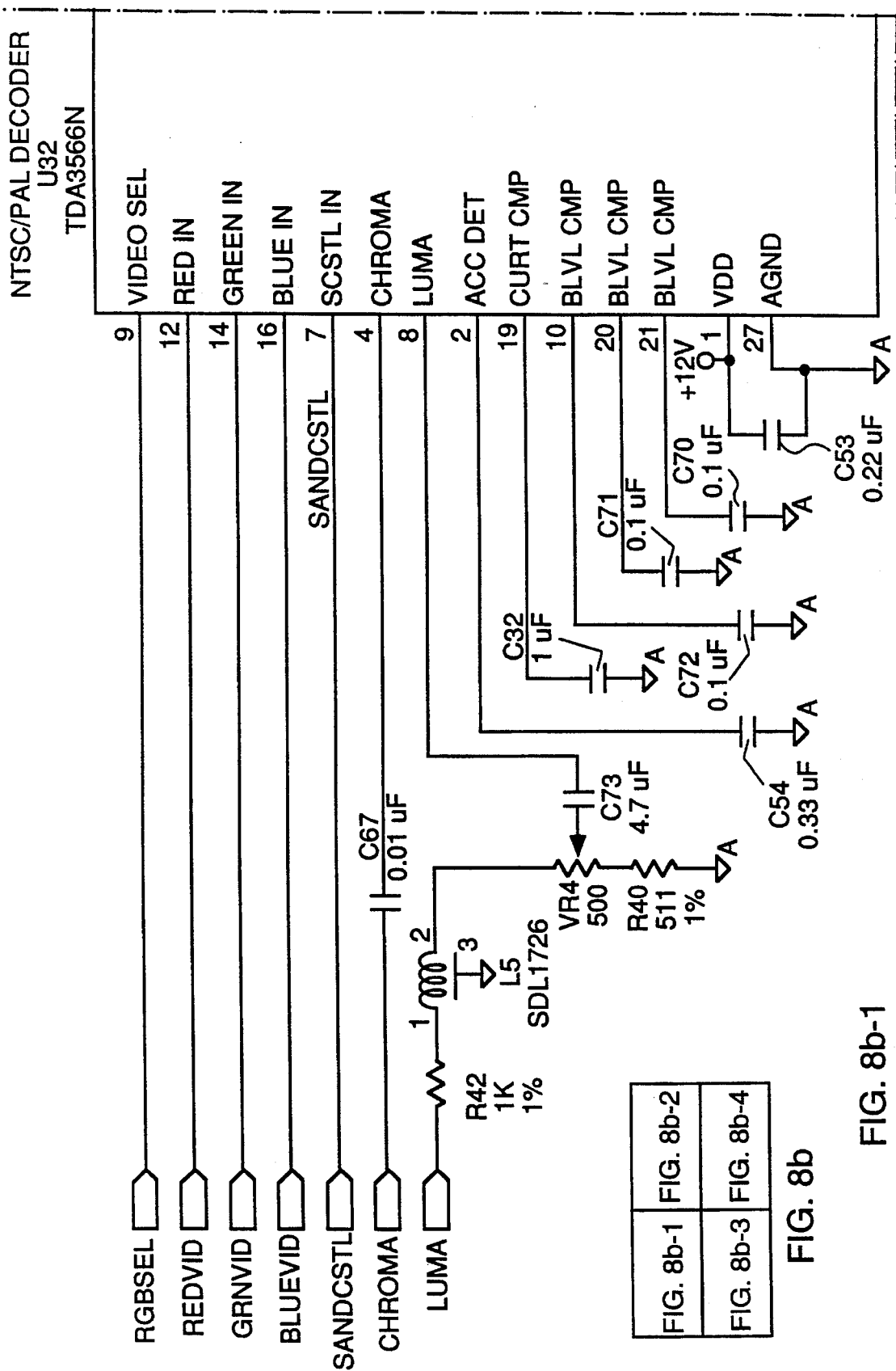
Figures 2, 8B:
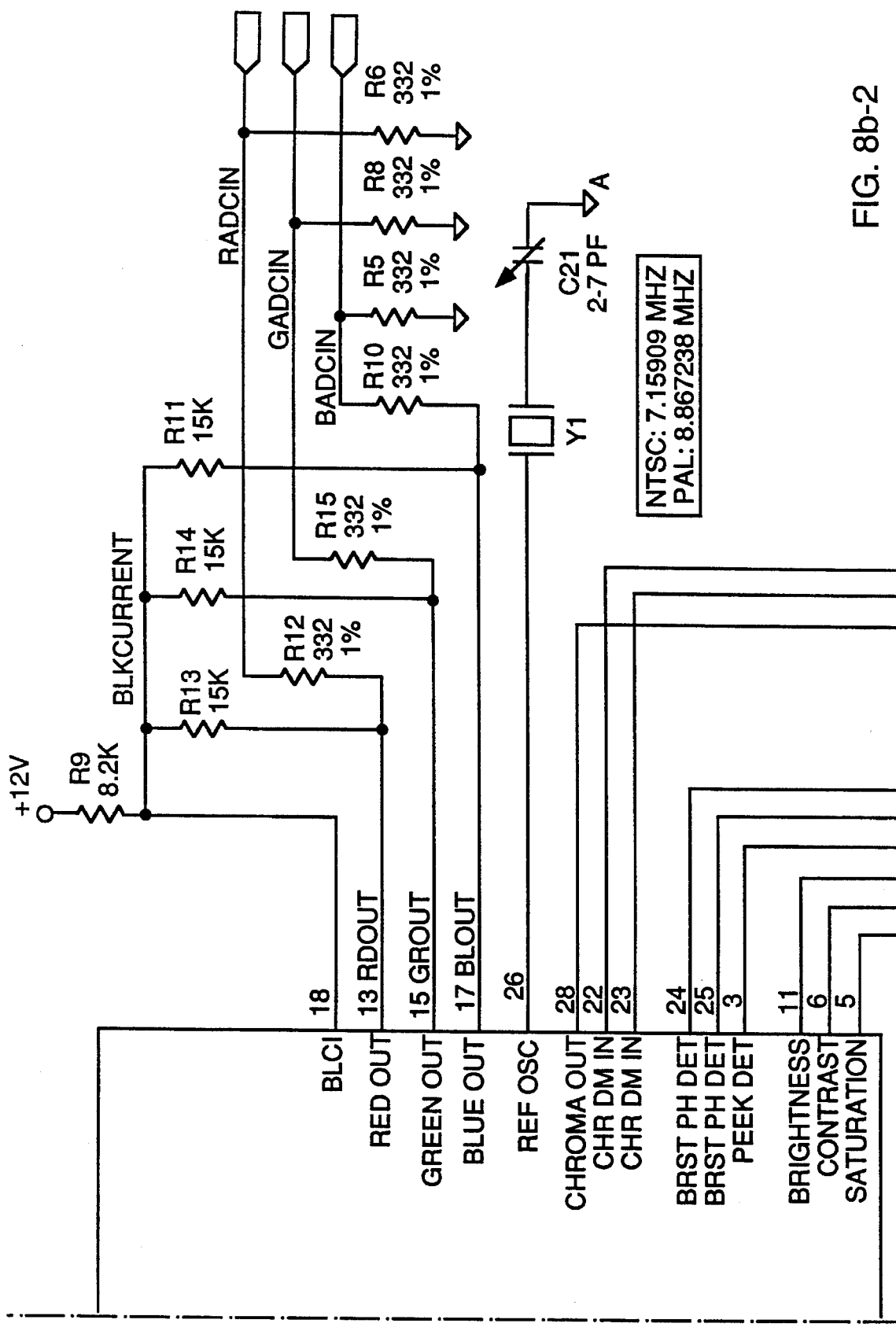
Figures 3, 8B:
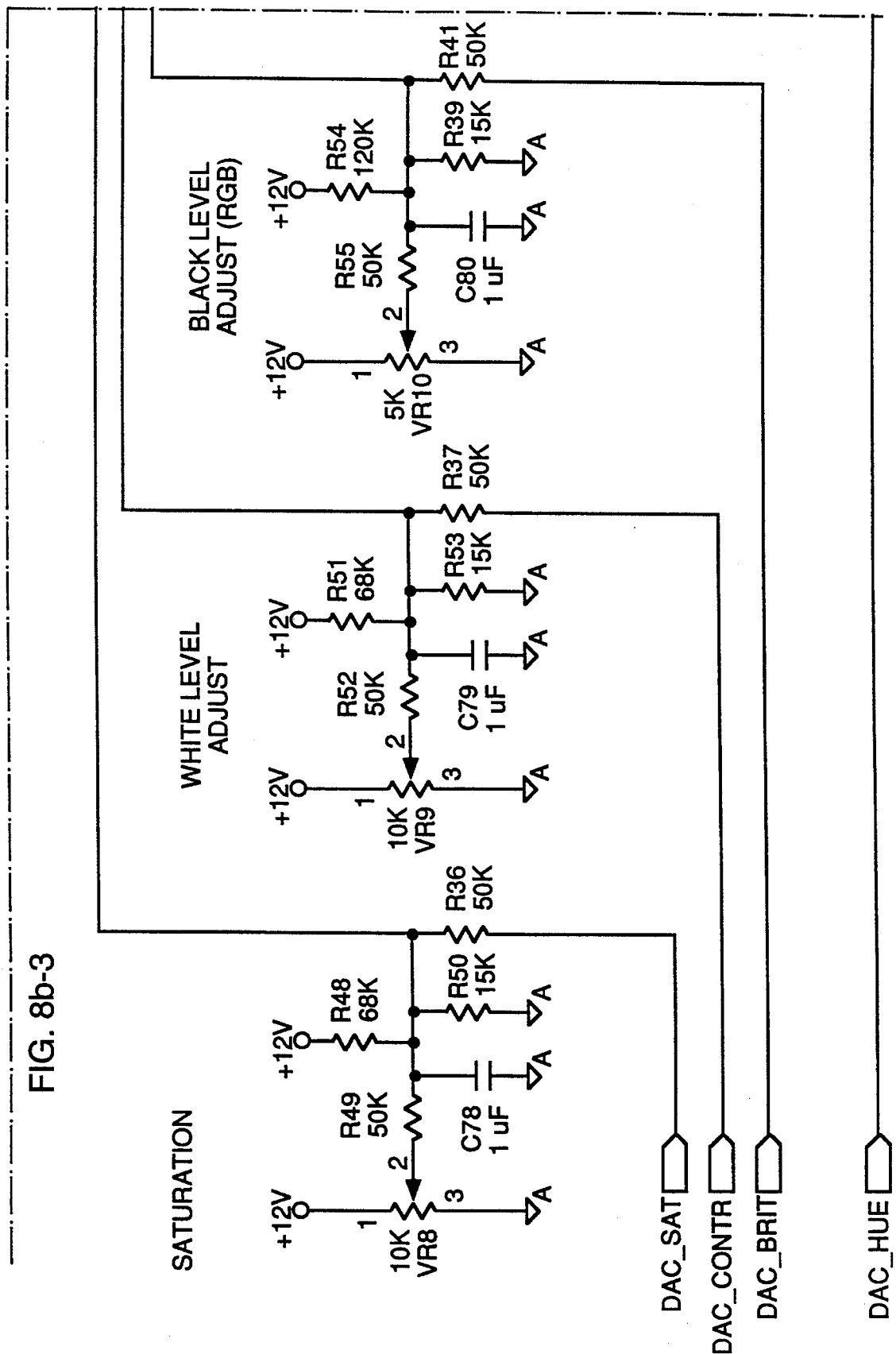
Figures 4, 8B:
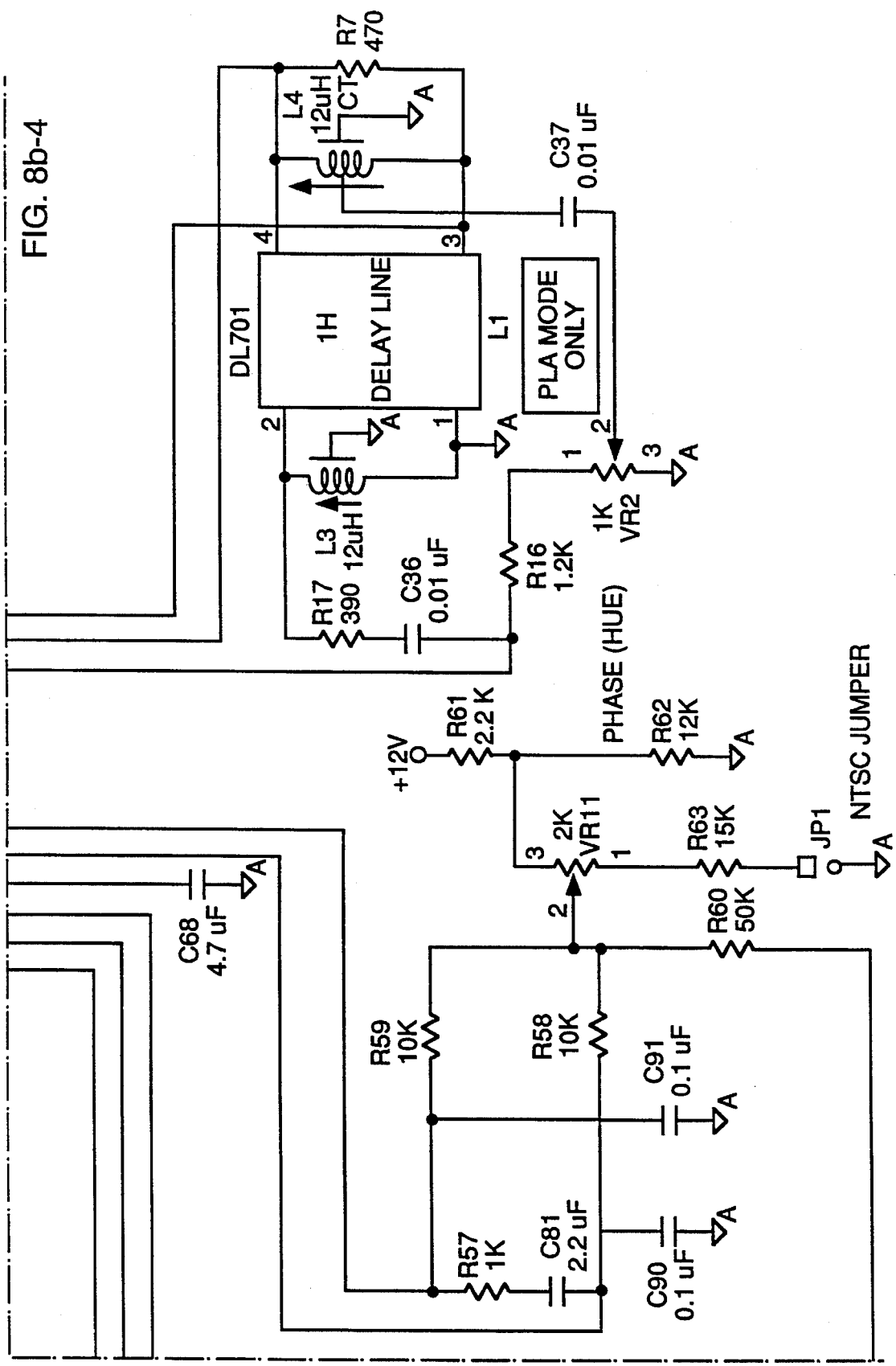
Figures 2, 8C:
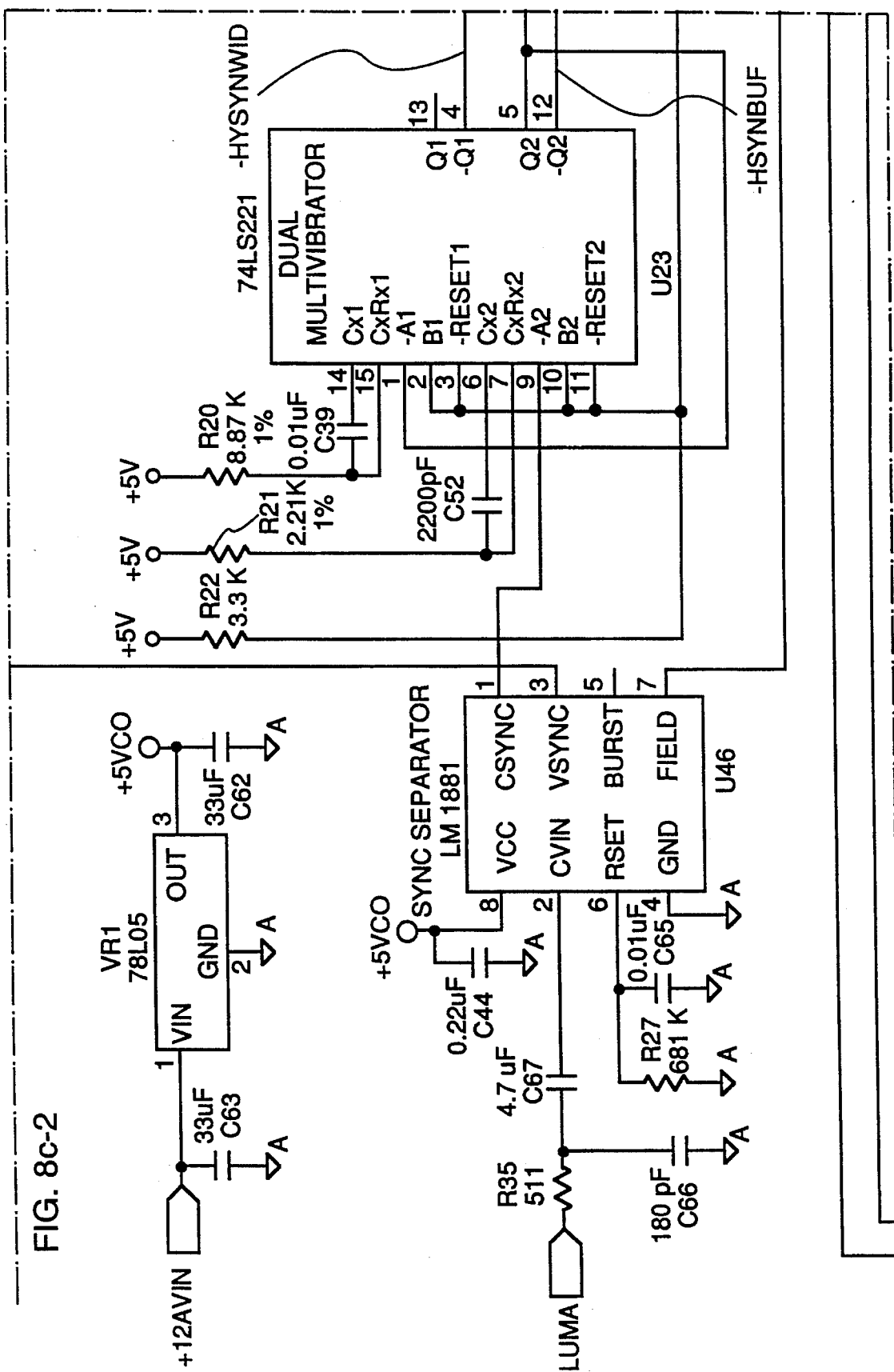
Figures 3, 8C:
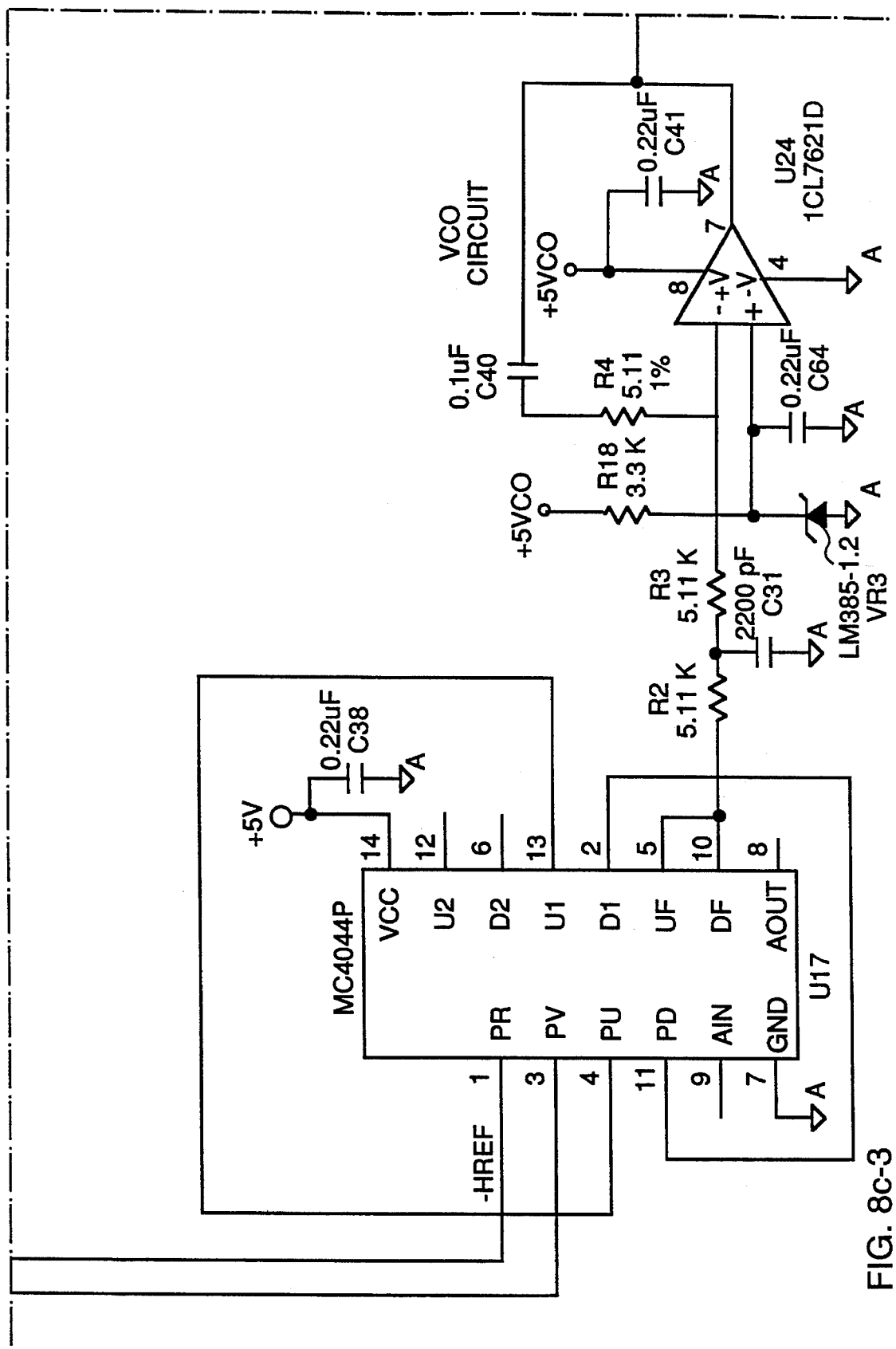
Figures 4, 8C:
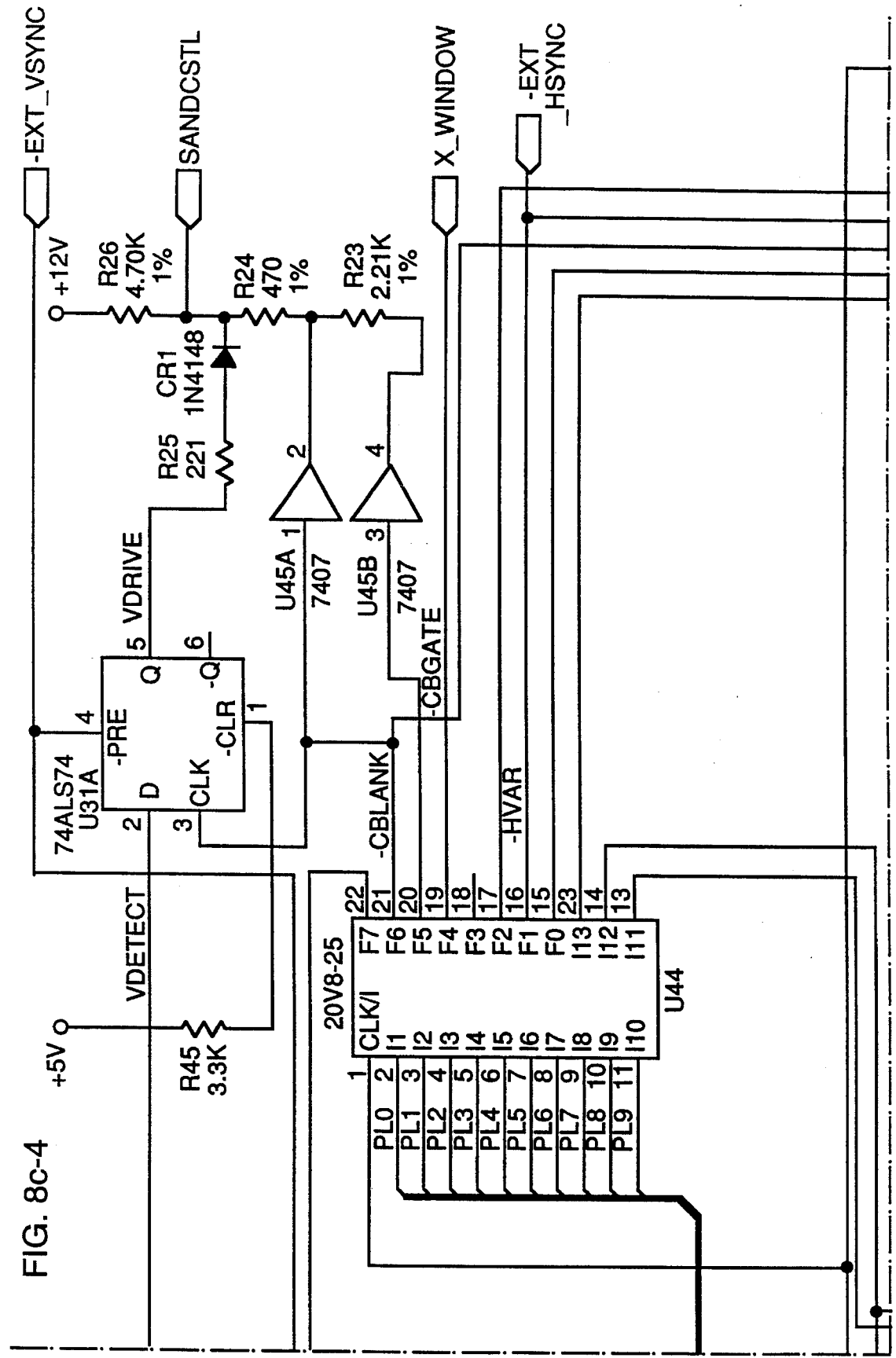

Pixel buffer 4, however, continues to be filled with data and will begin to back up. However, this is not a problem because during conventional blanking at the end of each incoming video scan line, pixel buffer 4 will have ample time to unload its data to frame buffer 8. If pixel buffer 4 is backed up to the point where it is not empty at the start of a new video scan line, control sequencer 14 clears the contents of pixel buffer 4 by providing a command on a reset (not shown) line (one of the Buf R/W lines 15). Control sequencer 14 in turn is connected by stop/start line 30, address control line 32, and output enable (OE) control line 34 to address generator 36. An address register (see FIG. 6) in address generator 36 is a read/write register containing a linear address value corresponding to the upper left corner of the window to be scanned, minus some number which is preferably 1,152. This is described in further detail below.

The output of the address register is provided to adders located in the address generator block. The adders calculate the start address of every scan line based on the previous internal calculated address. With the exception of the first line of an odd field, a value which in one embodiment is 2,304 is added to the internally calculated address at the start of every new scan line. At the first line of an odd field (conventionally, odd and even field fields are provided alternatively to make up one screen image) a value (which in one embodiment is 1,152) is added to the internally calculated address. This value 1,152 is the number of visible horizontal pixels per line for one type of monitor. The result of this addition is loaded into counters in the address generator. The counters, under control of control sequencer 14, are incremented by one for every pixel that is to be written to frame buffer 8. The counters thus generate an incremental address which is provided to frame buffer 8 on frame buffer address bus 37. As described above, address generator 36 is under control of control signals 26 supplied by the processor. The input of address generator 36 is also connected to the processor address/data bus 24, so address generator 36 can be programmed for the start address.

The above describes one embodiment of the invention. In accordance with a second embodiment of the invention, shown in block diagram form in FIG. 2, additional circuitry and a user interface are provided.

Figure 2:
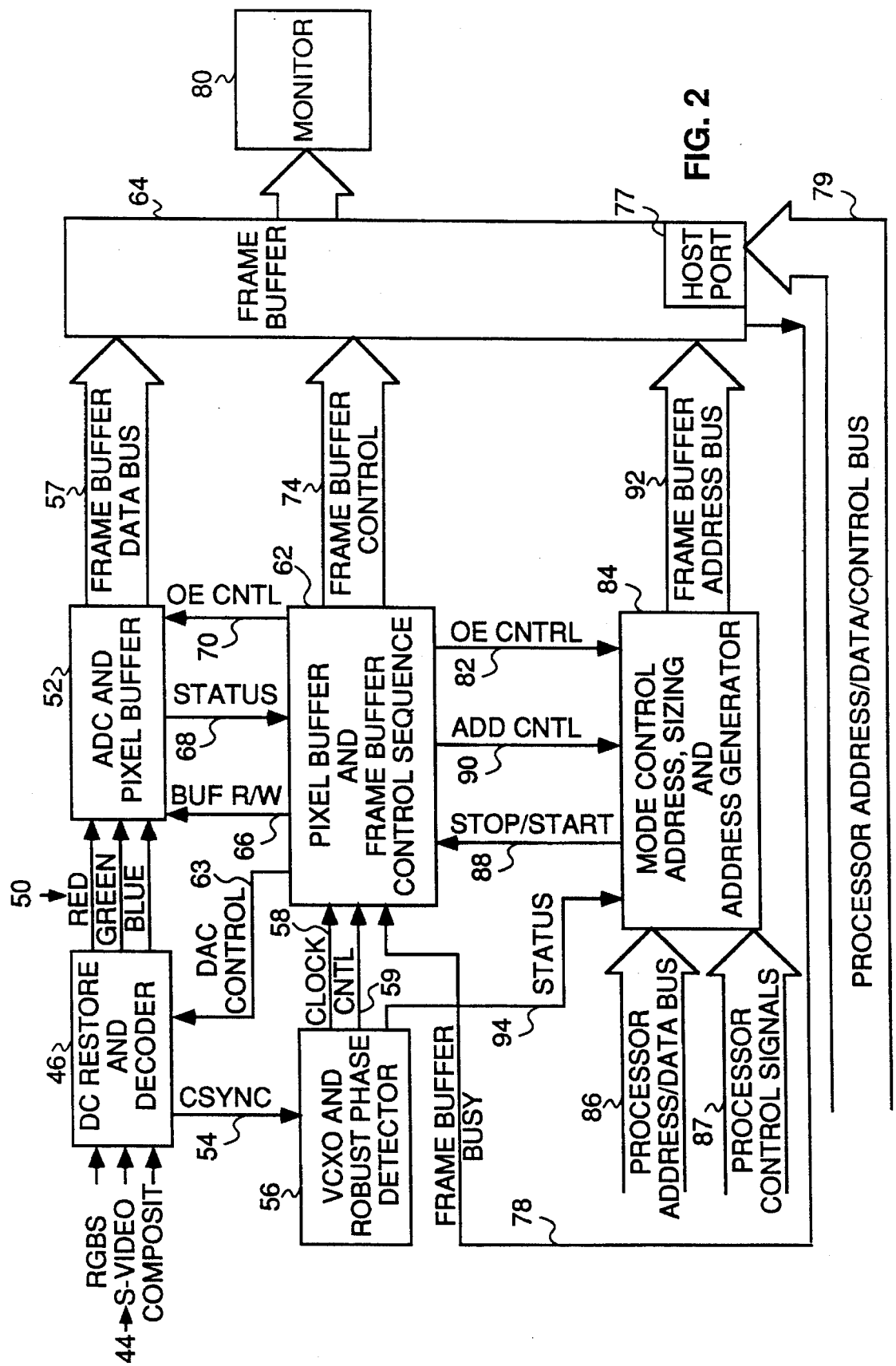
FIG. 2 depicts a second embodiment of the invention in block diagram form.

As shown in FIG. 2, various types of video analog input signals 44, i.e., RGBS, S-video, and composite video are provided to a DC restore and decoder circuit 46. An RGBS signal refers to RGB (red, green, blue) and synchronization; this is the standard RGBS signal. S-video, as described above, is super video (Y/C). Composite video is a conventional one-wire video transmission (the accepted television format throughout the world) in which chrominance and luminance components are multiplexed together onto a single conductor. Thus, in accordance with the present invention, the embodiment shown in FIG. 2 can accept all three of these types of video signals. In accordance with the invention, other types of analog video signals can also be converted.

DC restore refers to the process of direct current restoration which conventionally reduces the voltage level of an incoming video signal from a particular DC voltage bias level to a reference voltage level. Thus, a voltage-to-voltage level adjustment is provided in dynamic fashion at every scan line, so that if the picture becomes brighter or dimmer this activity does not affect the DC signal level. Since in most cases the incoming signal is AC coupled, the complete DC component, typically a 1.0-volt offset, is removed and the signal then is floating at a bias level convenient for the decoder circuitry, preferably 3.5 volts.

The video decoder in block 46 includes the analog components conventionally required to convert a composite video or S-video or RGBS signal into its red, green, and blue components. The decoder of block 46 also includes a conventional video switch which will switch in an RGBS video source as well as other types of video as described above. The decoded red, green, and blue components 50 are provided to conventional analog-to-digital converters (ADCs) in ADC and pixel buffer block 52. Each RGBS signal component is digitized in block 52 to an eight-bit value. Conventionally a value of zero is black and a value of FF is full on, i.e., maximum signal strength.

The decoder 46 also provides a conditional horizontal synchronization pulse (CSYNC) signal 54 to the voltage controlled crystal oscillator (VCXO) and robust phase detector circuitry 56. The VCXO and robust phase detector 56 are conventional. The VCXO provides system clock signals and sample clock signal 58 to the ADCs and to control sequencer 62. The VCXO is conventionally phase-locked to the incoming conditioned horizontal synchronization pulse (CSYNC) 54. The VCXO produces a clock signal 58 which is, in accordance with one embodiment of the invention, 776 times faster (for NTSC) or 944 times faster (for PAL) than the horizontal synchronization pulse (CSYNC 54). These clock signal frequencies correspond to frequencies of respectively 12.2098 MHz and 14.750 MHz.

The robust phase detector in block 56 is a circuit including an internal process which allows intelligent phase detection. Thus if the reference signal (i.e., CSYNC signal 54) ceases for a moment, the robust phase detector bounces over, i.e., flywheels over that missing portion of the signal. Thus, a slight interruption in incoming reference signal 54 is tolerated. In addition, robust phase detector 56 is capable of detecting large phase errors and readjusting itself dynamically to account for those errors. This is beneficial because in many inexpensive video tape recorders the synchronization signal 54 is injected externally and may be as much as half a line (180°) out of synchronization. The robust phase detector detects this 180° out-of-phase condition and recovers from this condition. Control line 59 connects the robust phase detector circuitry to control sequencer 62. Control line 59 tells the sequencer 62 when valid video data is available.

In accordance with this embodiment of the invention, the analog-to-digital converters are included in the same block 52 as is the pixel buffer discussed in connection with the embodiment shown in FIG. 1. The pixel buffer in block 52 may alternatively be in the form of a conventional FIFO memory or may be a series of latched flip-flop circuits. Thus, the information once converted to digital format by decoder 46 and the analog-to-digital converters in block 52 is provided to pixel buffer block 52. The pixel buffer as discussed above is in use during times when frame buffer 64 must regain or have control of the video RAM memory. There are short periods when that control is necessary in order to keep the update of monitor 80 screen from losing synchronization lock with monitor 80, because the contents of the video RAM must be displayed at a rate that is correct for the monitor and that is correct for the frame buffer. Pixel buffer 52 then buffers up the incoming data for a duration of several pixels before providing the data to frame buffer 64 on frame buffer data bus 57. Once memory control is relinquished, control sequencer 62 (which controls the pixel buffer 52) continues to update the video RAM in frame buffer 64. The size of pixel buffer 52 is determined by the difference between the absolutely lowest scan rate and the absolutely highest scan rate which must be dealt with. The larger this difference, the larger the size of pixel buffer 52 required. In accordance with one embodiment of the invention, pixel buffer 52 holds 64 pixels each of 24 bits going from a scan rate of 15.734 KHz to one of 64 KHz.

The configuration of pixel buffer 52, as discussed above, may be conventional latched flip-flops or conventional FIFO-type memory. In accordance with one embodiment of the invention, the FIFO-type memory is used partly since it is less expensive. The use of the FIFO-type memory is also preferred because if the exact scan rate is not known, then the variable capacity of the FIFO-type memory is better able to cope with the variable scan rates. Thus, latched flip-flops would be used if the scanned difference between the highest scan rate and the lowest scan rate is known so that the exact number of latched flip-flops needed can be provided.

Pixel and frame buffer control sequencer (the "control sequencer") 62 controls pixel buffer 52 and frame buffer 64 in similar fashion as described above in connection with the embodiment of FIG. 1 Control sequencer 62 also provides DAC (digital-to-analog converter) control signals to decoder 56 on line 63. These signals allow the user to adjust the conventional brightness, contrast, hue, and saturation in decoder 46. Control sequencer 62 is connected to pixel buffer 52 by buffer read/write line 66, status line 68, and OE control line 70, and to frame buffer 64 by control lines 74. Control sequencer 62 is preferably a state machine for controlling the rate of incoming and outgoing signals. When control sequencer 62 is triggered to begin a frame grab, control sequencer 62 looks for a particular incoming signal such as the horizontal and vertical synchronization signal 20 or the signal indicating what line of the frame is being provided on line 59.

At this active scan line of the frame, control sequencer 62 begins filling pixel buffer 52 upon receipt of a command on pixel buffer write (bur R/W) line 66 and also begins writing to video RAM in frame buffer 64 via frame buffer control lines 74. Also control sequencer 62 looks for the frame buffer busy signal on line 78. The frame buffer busy signal is a feedback signal indicating that frame buffer 64 is busy, thus warning control sequencer 62 that frame buffer 64 is about to perform a refresh cycle or host access and will require control of the video RAM in frame buffer 64. A host access to frame buffer 64 (as explained above) is performed by the host providing digital video data directly to host port 77 of frame buffer 64 on processor address/data/control bus 79. Host port 77 includes address/data/control buffers and latches (not shown).

At this time control sequencer 62 acknowledges the frame buffer busy signal by making all signals to the frame buffer 64 inactive, i.e., goes to a tri-state, thus allowing frame buffer 64 to perform its task of sending data to monitor 80. At the same time, control sequencer 62 does not stop sampling incoming signals but instead directs them to pixel buffer 52. This buffering step is necessary due to the continuous nature of the incoming video signals 44. As soon as the frame buffer busy signal on line 78 indicates that frame buffer 64 is no longer busy, control sequencer 62 initiates a new cycle. The OE (output enable) control lines 70, 82 carry the control signals which tri-state the frame buffer bus lines for, respectively, pixel buffer 52 and address generator 84.

As discussed above, control sequencer 62 also controls address generator 84 which in this embodiment includes mode control, address, and sizing registers. Address generator 84 in this embodiment is similar to the address generator in the above-described embodiment discussed in connection with FIG. 1, and includes two stages. The processor data is provided on the processor address/data bus 86 to program address generator 84, mode control, address, and sizing registers. The processor (host) control lines 87 do the actual writing of the programmed information into the above-mentioned registers. This allows the user interface portion of the device to be active as discussed below.

The address register of address generator 84 contains the start location of where the image is to be placed on the screen, which conventionally is the upper left hand corner of the image. This placement allows the possibility of windows, i.e., images imposed on the screen which are smaller size than the full monitor screen. A feedback loop (i.e., the stop/start line 88) is provided between control sequencer 62 and address generator 84. Thus the address is incremented by address generator 84, and the data is written to frame buffer 64 VRAM. Therefore the data to frame buffer 64 is provided from pixel buffer 52 on frame buffer data bus 57, and the address of the data is provided by address generator 84 on frame buffer address bus 92. When the frame buffer busy signal arrives on frame buffer busy line 78 to control sequencer 62, control sequencer 62 shuts down the data flow and also shuts down address 92 and control lines 74 to frame buffer 64. At this time, address generator 84 also stops incrementing the address. Therefore the address and the data always match in terms of where the data are intended to be placed on the screen of monitor 80 once address generator 84 and control sequencer 62 are restarted. It is thus not necessary to buffer address generator 84. The status of phase detector 56 is provided to address generator 84 on status line 94 to allow the host processor to poll this bit and get information about the incoming line video.

In accordance with the invention, a user interface as discussed above is provided. This user interface is preferably implemented in software in the form of a C-language program running on the processor of a host computer system. An example of a C-language program in accordance with the invention is shown in FIGS. 3a–3i. The purpose of this software user interface is to make the converter user friendly, by allowing access to the scaling and window location registers as discussed below. This picture manipulation feature enhances the usability of the converter.

The following describes operation of the software in accordance with the invention. All internal registers have a 32-bit format. The register data is in the eight least significant bits, i.e., bits D07–D00. The control register (see FIG. 4) in control sequencer 62 allows software associated with the processor to select video source 44 of FIG. 2, start and stop the operation of the converter, and enable window scaling by use of processor address/data bus 86 and processor control signals 87. The control register is a read/write register. The SDA bit refers to serial data. The SCL bit refers to the serial clock. The SCL bit is the communication bit to DACs in block 46 that allow the brightness, contrast, hue, and saturation of the picture to be digitally controlled. The two bits indicated by X are not used in this embodiment of the invention. The FS bit is the full size bit for enabling the size registers in block 84 to become active (i.e., scaling). The value one in the FS bit enables the size register to provide a full size picture. The start bit is used so that a one in this register will start the converter operation. Zero in the start bit stops the converter operation. The VS1 and VS0 bits indicate video source 44 (see FIG. 2) selection. As shown in the table below, VS and V0 are used to indicate a composite or S-video or RGB inputs.

| VS1 | VS0 | |
|-----|-----|-----------|
| 0   | 0   | Composite |
| 0   | 1   | S-Video   |
| 1   | X   | RGB       |

Thus, in accordance with the preferred embodiment, the type of video input is automatically detected by use of the VS1 and VS0 bits and compared to the IDC (input devices connected) bit.

Figures 5, 8C:
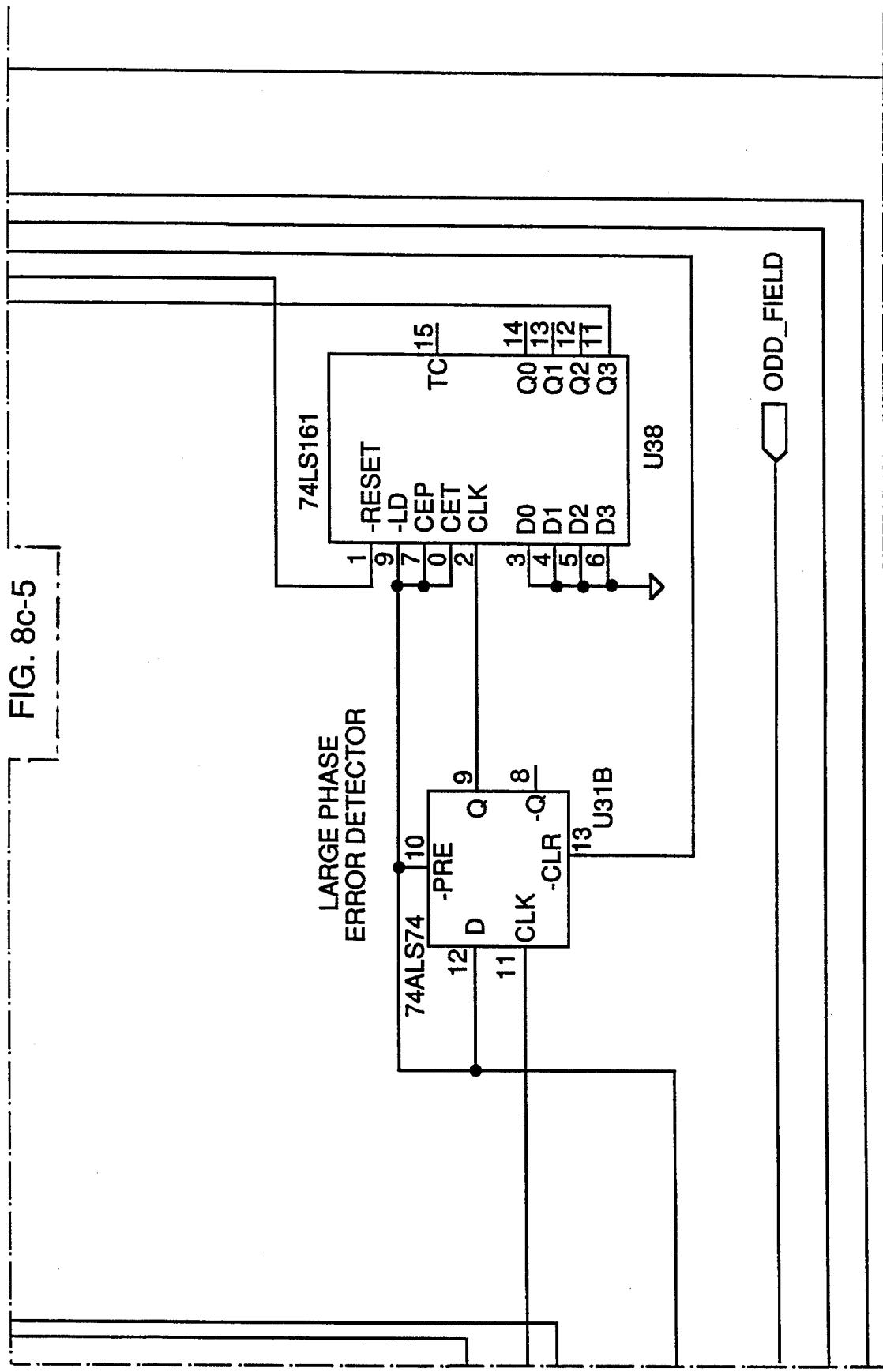
Figures 6, 8C:
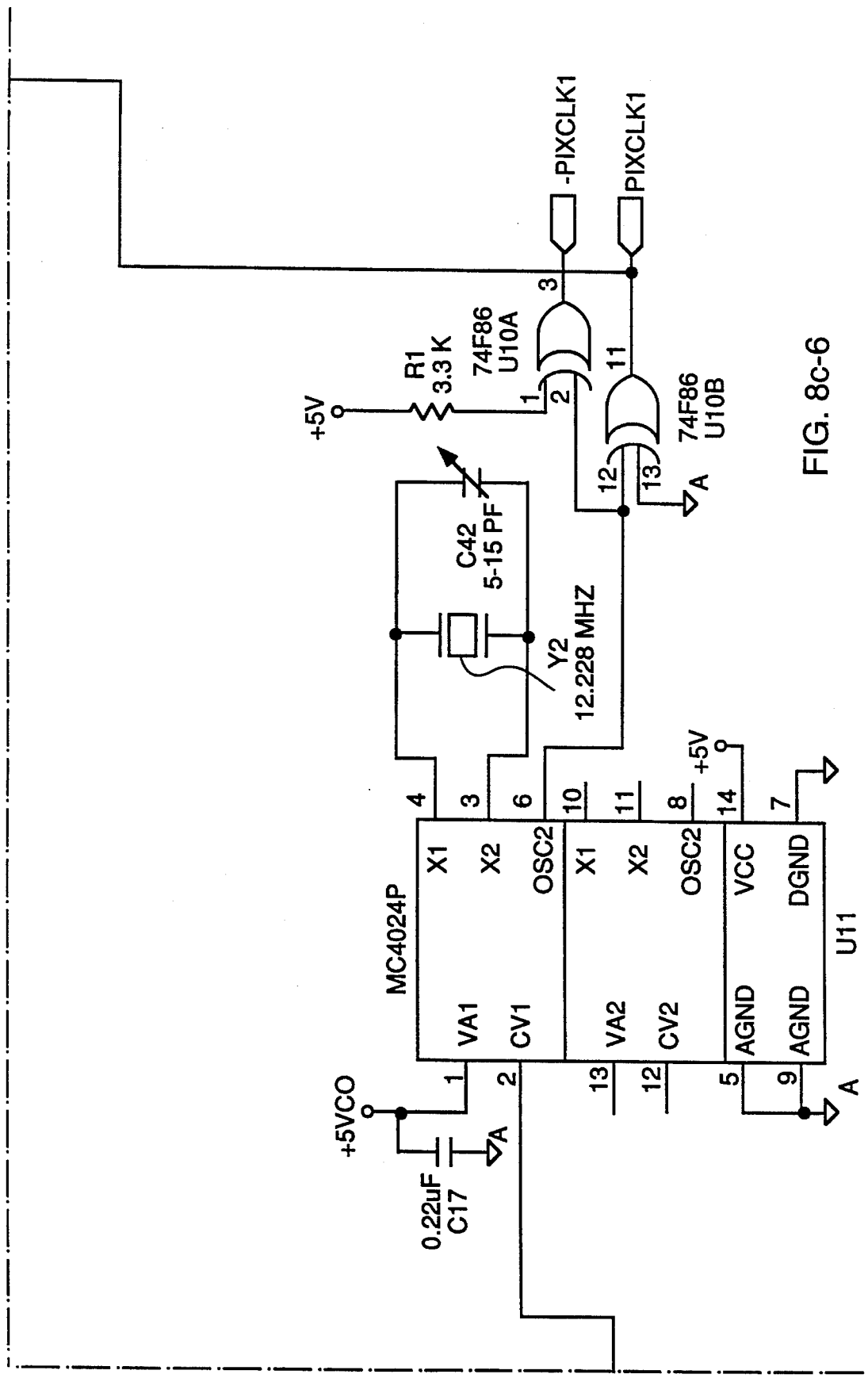

The status register in FIG. 5 (part of mode control in block 84) includes the bits as shown. If the IDC bit is one, this indicates that the video source selected by the VS1 and VS0 bits in the control register is active. A zero value for the IDC bit may indicate a bad connection to the video source or no power to the video source. The IDC bit is polled to determine if a valid video source has been selected. The SCLO bit is described above. When the VSYNC bit is zero this indicates that the selected video source is in vertical retrace. The VSYNC bit is used typically during freeze frame to ensure that a full field is complete.

Another register provided in block 84 in this embodiment is the x-y size register (shown in FIG. 6) which allows dynamic window sizing. One of 16 values can be loaded into each x and y nibble. X and y are the rate at which pixels are discarded in the x and y direction when an image is reduced in size so as to become a window on the screen of monitor 80.

Dynamic window scaling allows the user to scale the video window to various sizes. A pixel dropping method is employed to accomplish this task. In this method, incoming digitized pixel data is selectively not written into the pixel buffer 52. In the x direction pixels are selectively not written. In the y direction, entire lines are selectively not written. Control signals X_SIZE and Y_SIZE (which are outputs from the sizing circuitry in block 84 which provides selective pixel dropping as described below) go directly into control sequencer 62. When X_SIZE or Y_SIZE are in an active state, control sequencer 62 disables writing to pixel buffer 52 for as long as X_SIZE or Y_SIZE are active, hence pixels and lines can be dropped to accommodate the selected window size.

There are several algorithms that can accomplish the selective pixel dropping. One is the n/m algorithm, where m is the total number of incoming visible digital pixels (pre-pixel buffer 52), and n is the number of pixels desired in the scan converted video window. In the x direction m is equal to 640. In the y direction the same formula applies, except that horizontal lines are counted instead of pixels, and in the y direction m is equal to 480.

In one embodiment of the present invention, a simplified version of this algorithm is implemented. This implementation allows for 16 fixed window sizes. For this reason the two x-y size registers in block 84 need be only four bits each (i.e., one eight-bit register partitioned into two nibbles as in FIG. 6). The formula implemented for the fixed scale sizes is: (15-d)/(16-d), where d controls the window scale ratio. The d value is loaded into the x-y size register from processor address/data bus 86 and processor control signal bus 87. The x-y size register may be loaded with different values to give a "stretched" look in the window. Full size (640×480) is accomplished by setting the FS bit in the Control/Status register. The x-y size register and the Control/Status register are both located in block 84.

The linear start address register in address generator 84 of FIG. 2 contains a value of the upper left corner of the window (i.e., window location) to be displayed minus a value which preferably is 1,152 as discussed above. FIG. 7 shows the bit arrangement of this register, shown as being three 8-bit registers. In accordance with the preferred embodiment of the invention, the linear start address register is in the form of a linear frame buffer scheme where the addresses are all in one stream line-by-line. Alternately, a binary-type stream where the left edge is always at an even binary break point (i.e., 256, 512, 768, 1024, etc.) may be used. Thus, a linear address structure is used in accordance with the invention.

Figures 2, 8D:
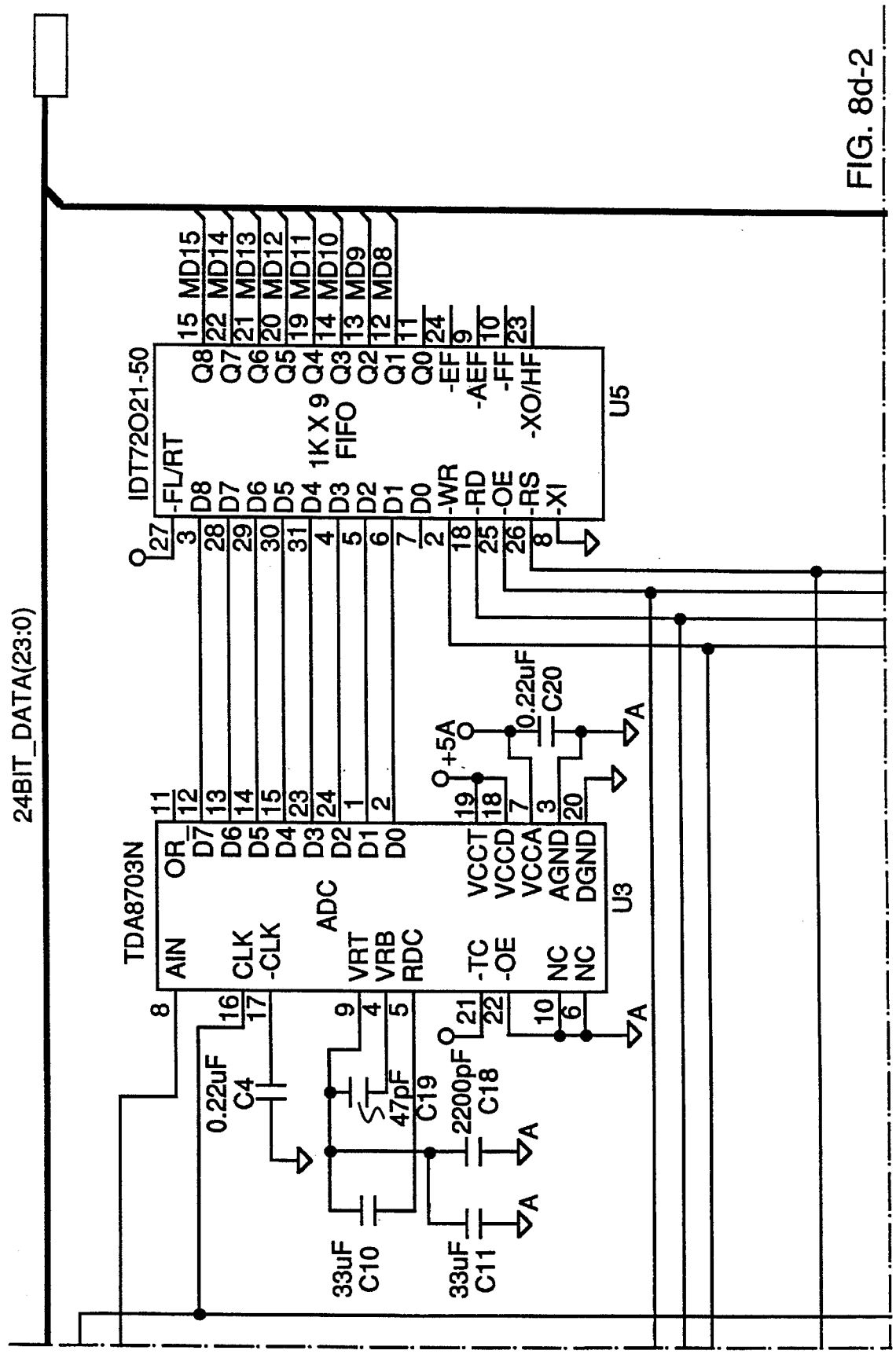
Figures 3, 8D:
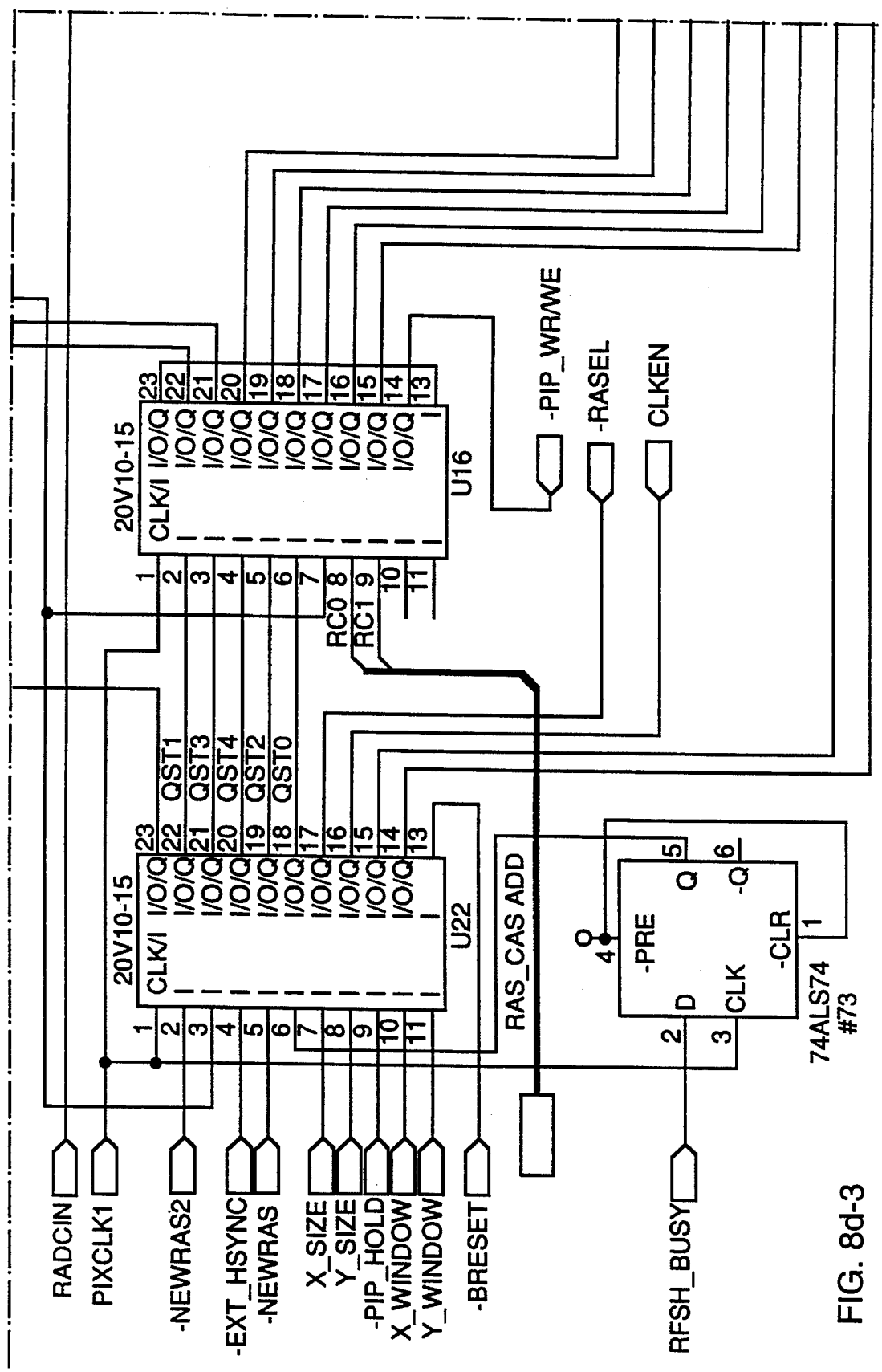
Figures 4, 8D:
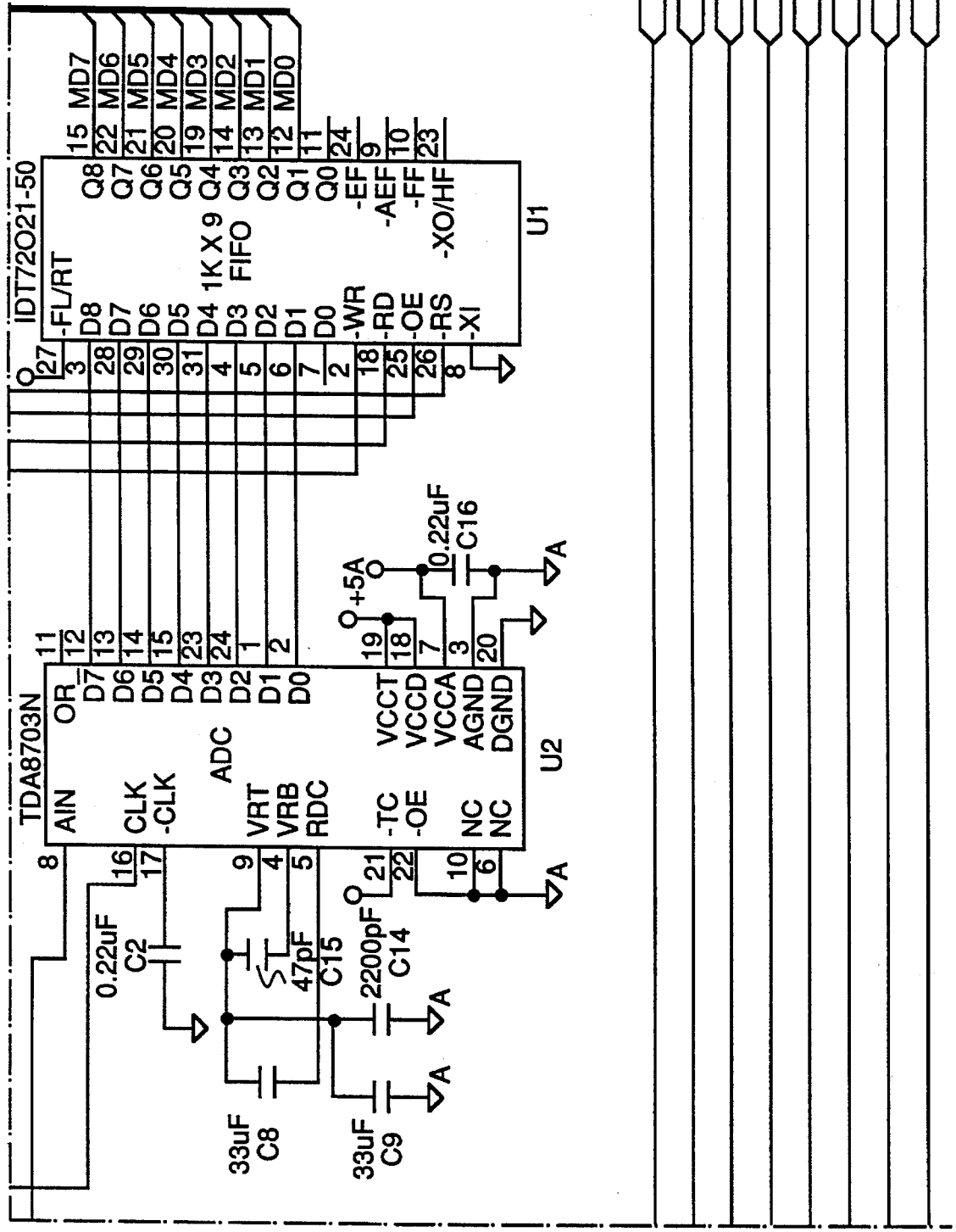
Figures 1, 8E:
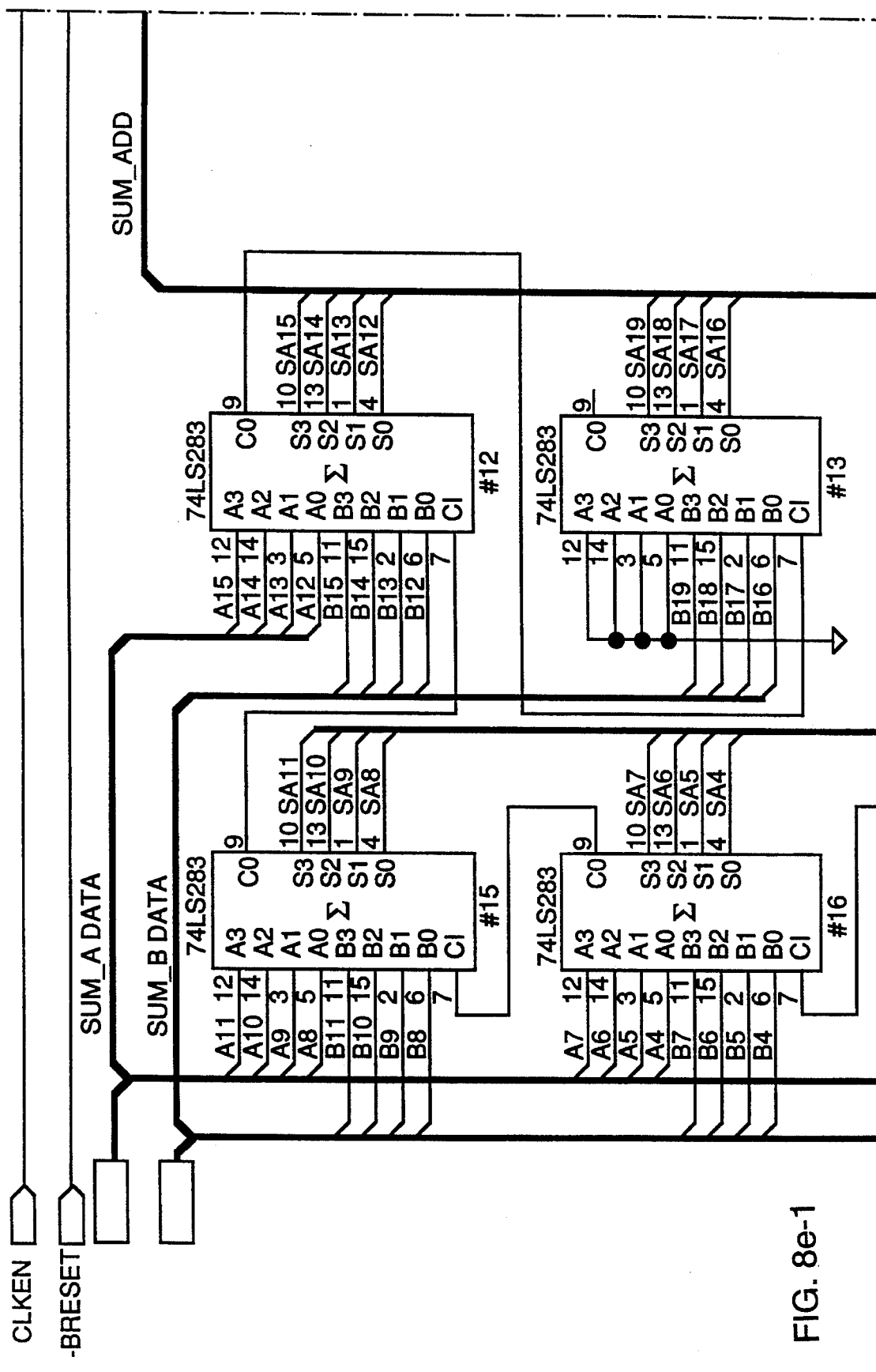
Figures 3, 8E:
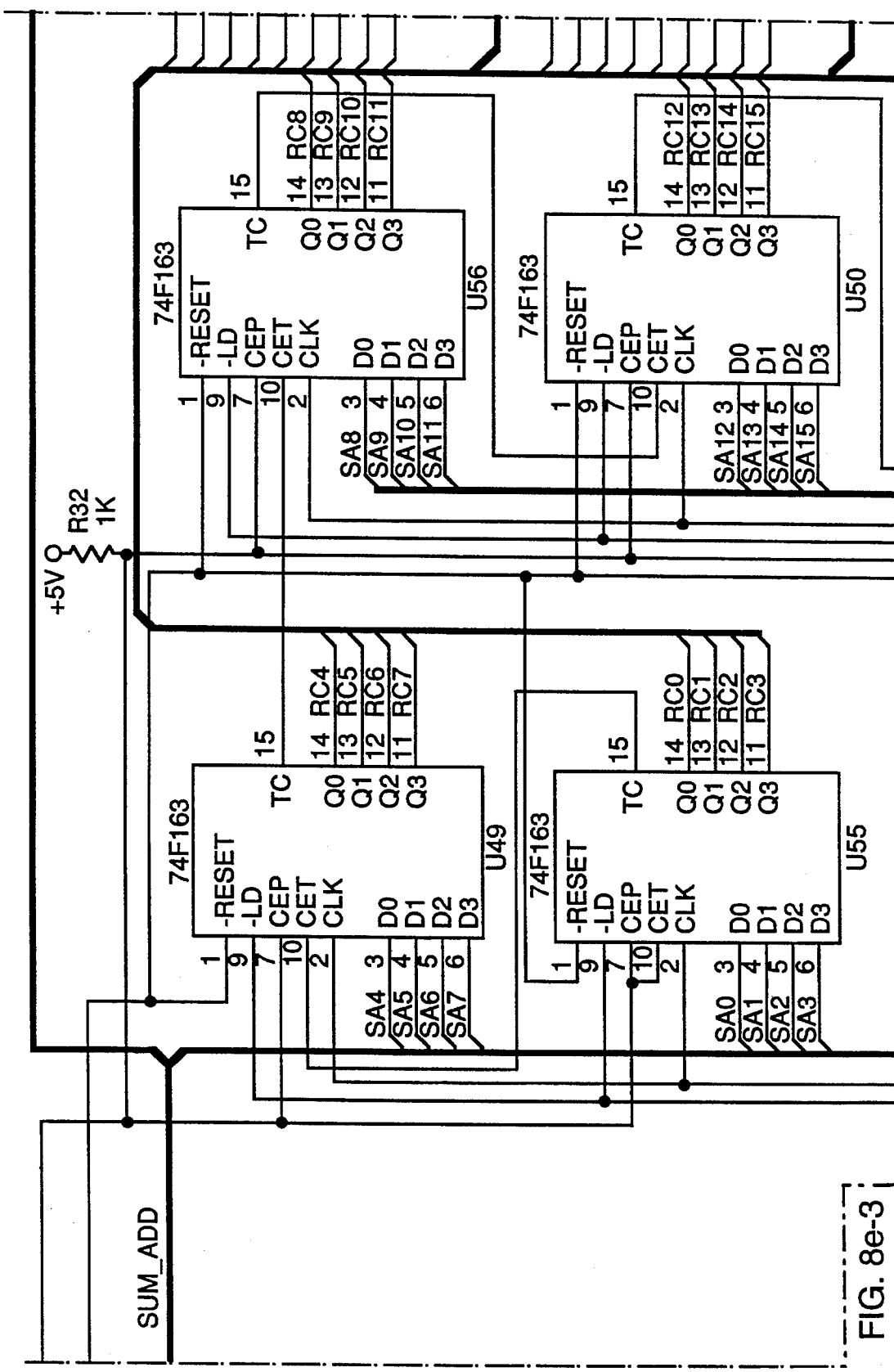
Figures 4, 8E:
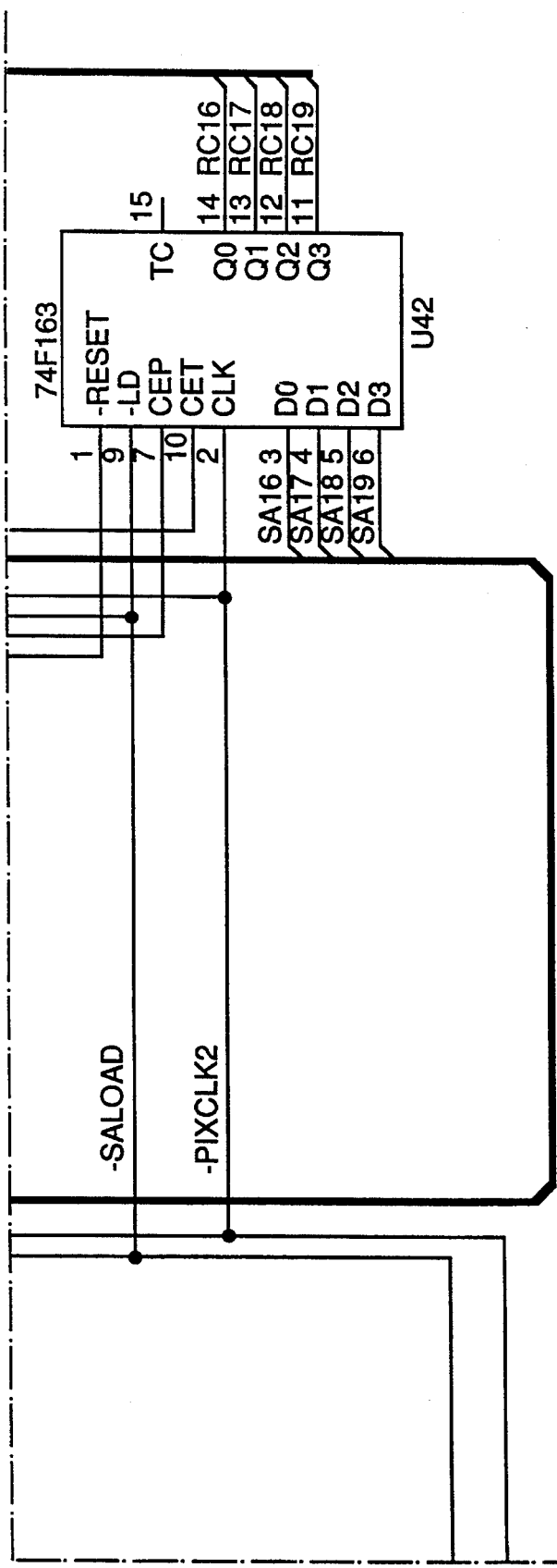
Figures 5, 8E:
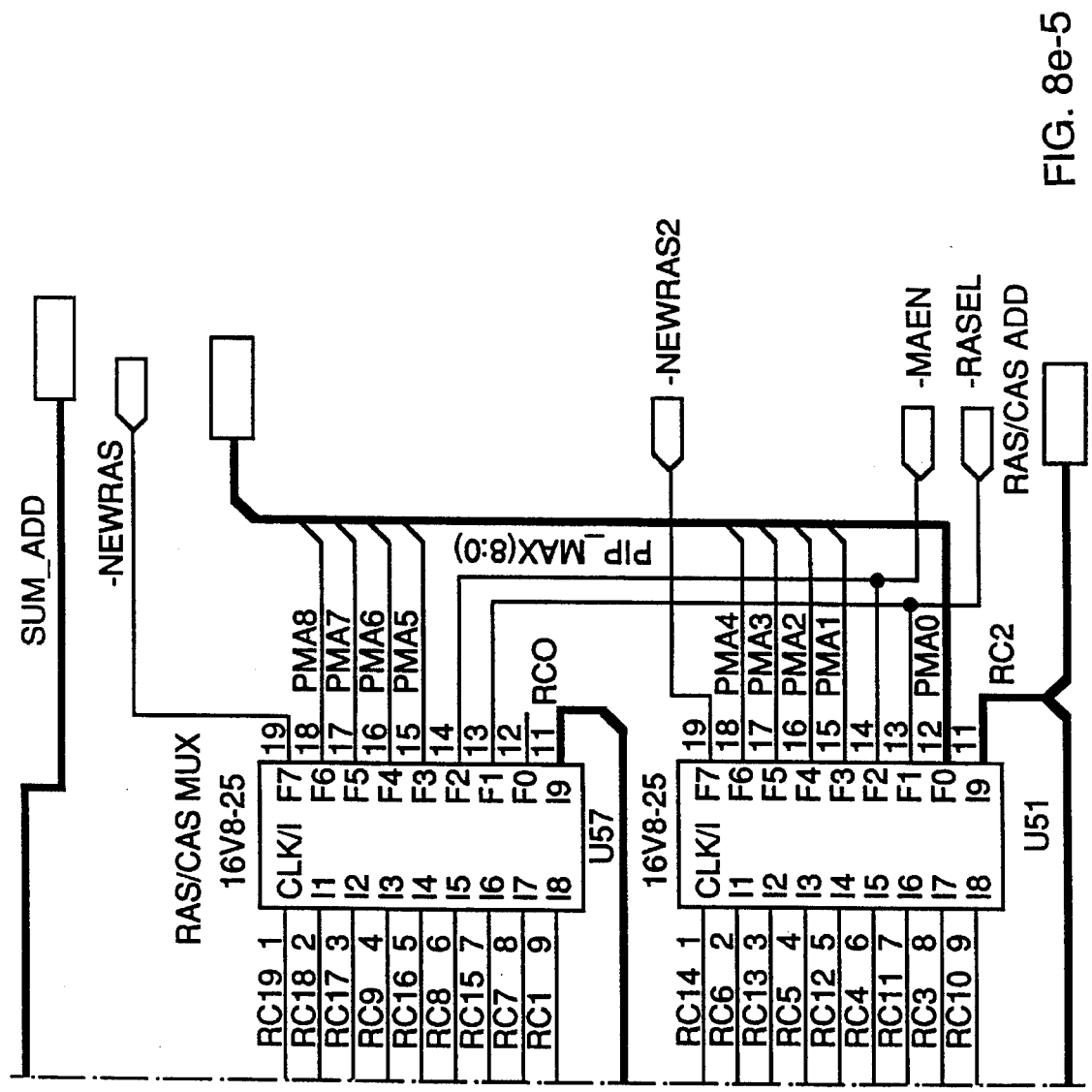
Figures 1, 8F:
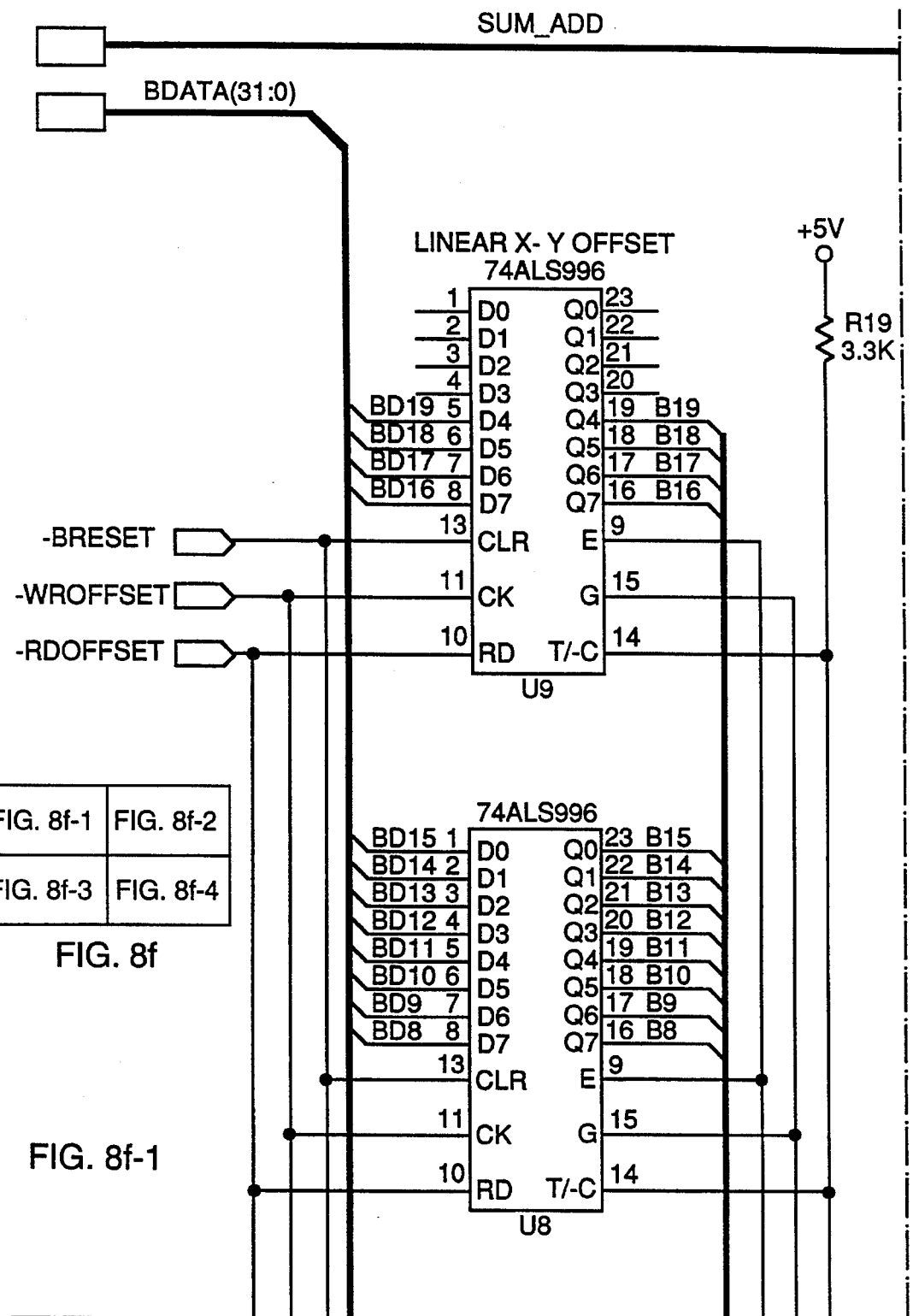
Figures 2, 8F:
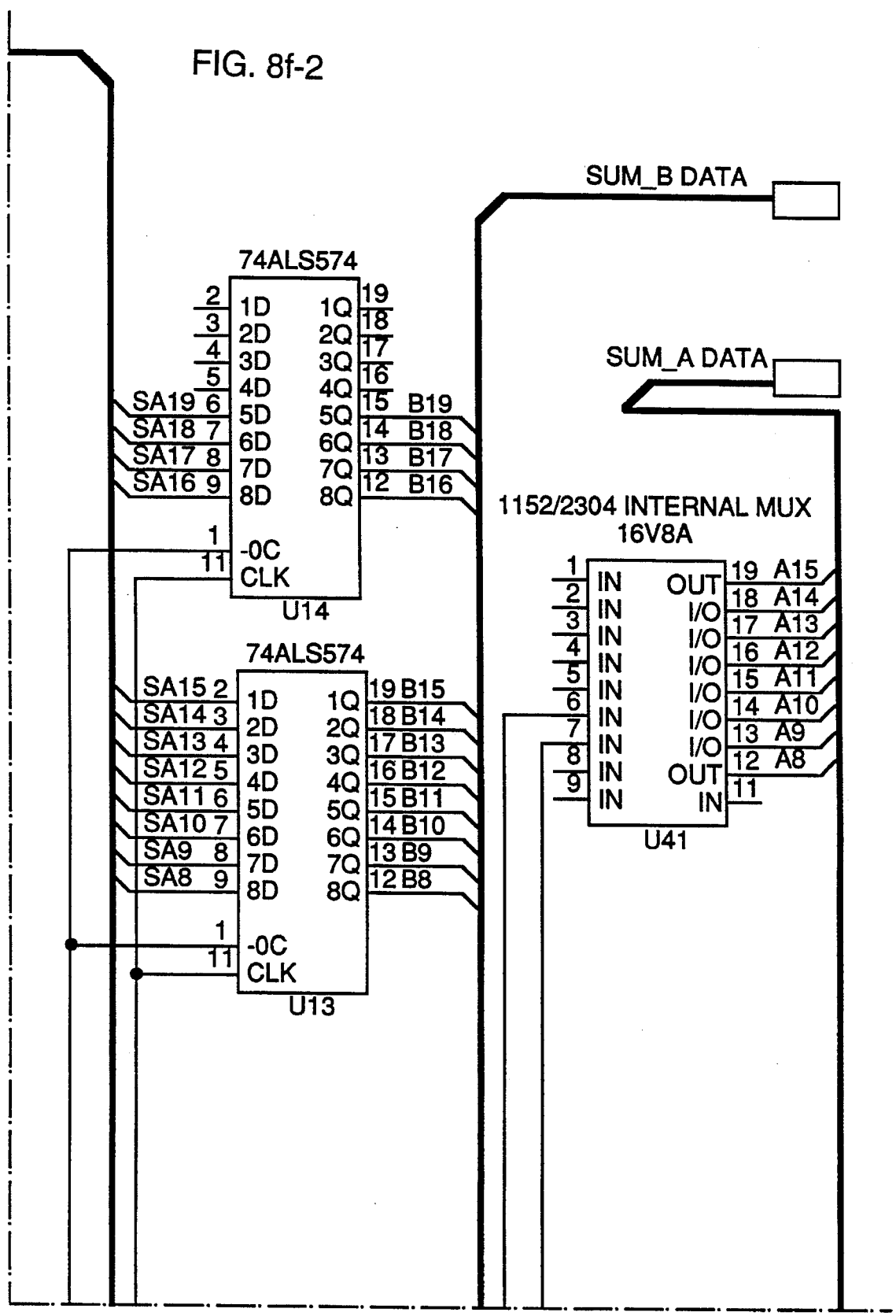
Figures 3, 8F:
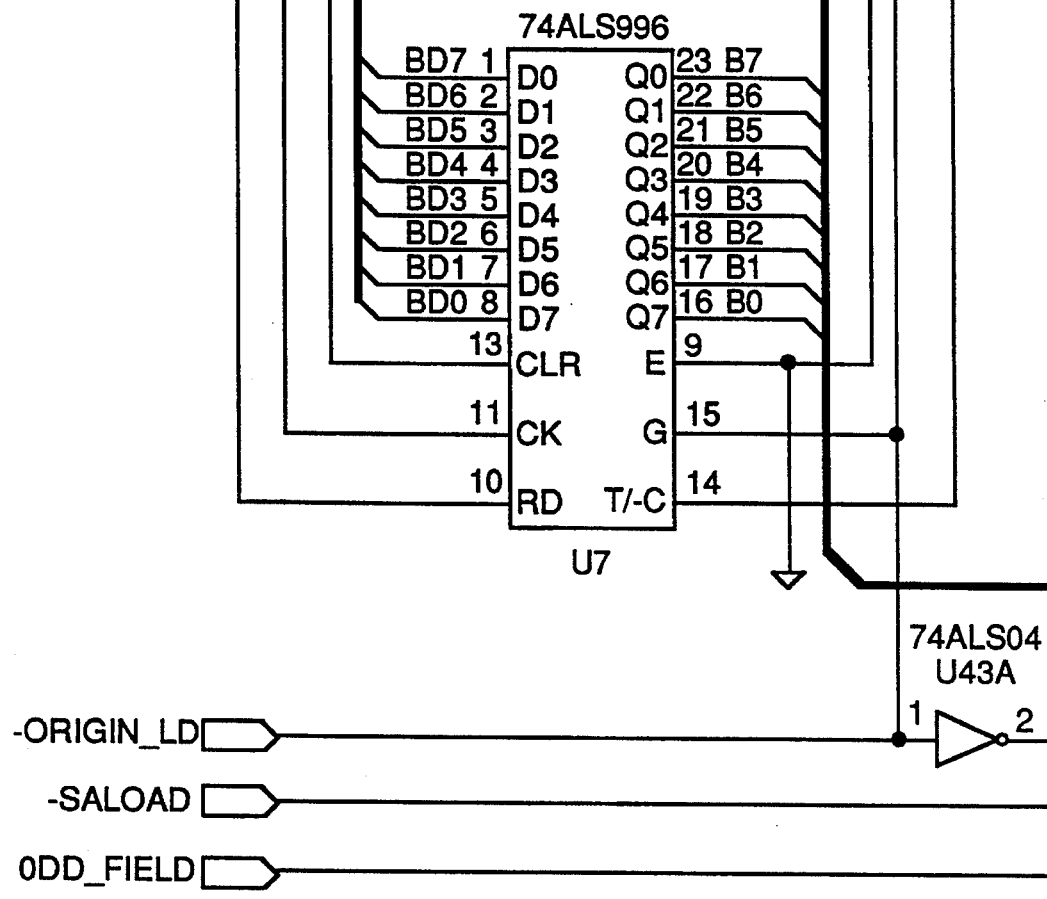
Figures 4, 8F:
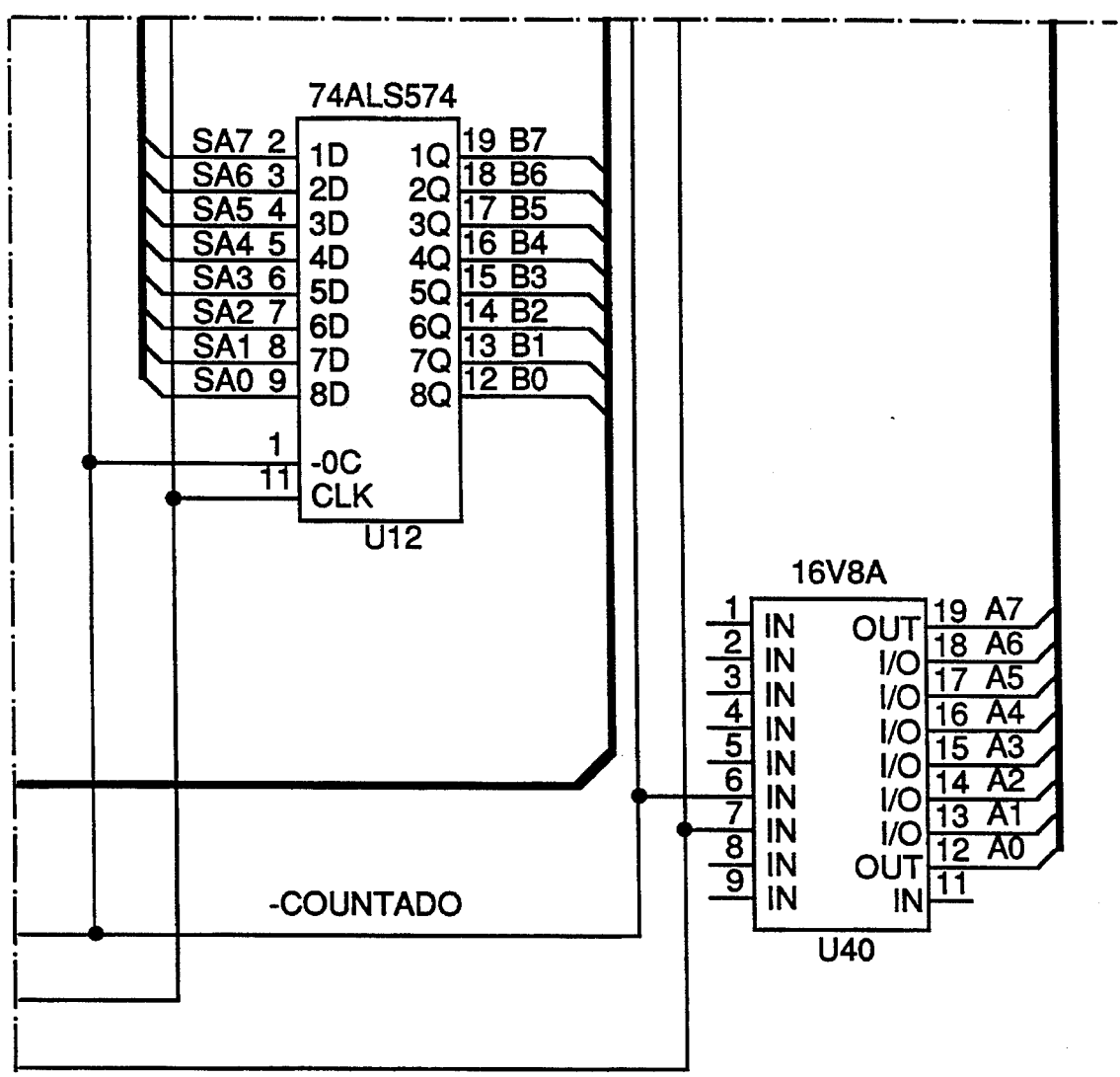
Figures 1, 8G:
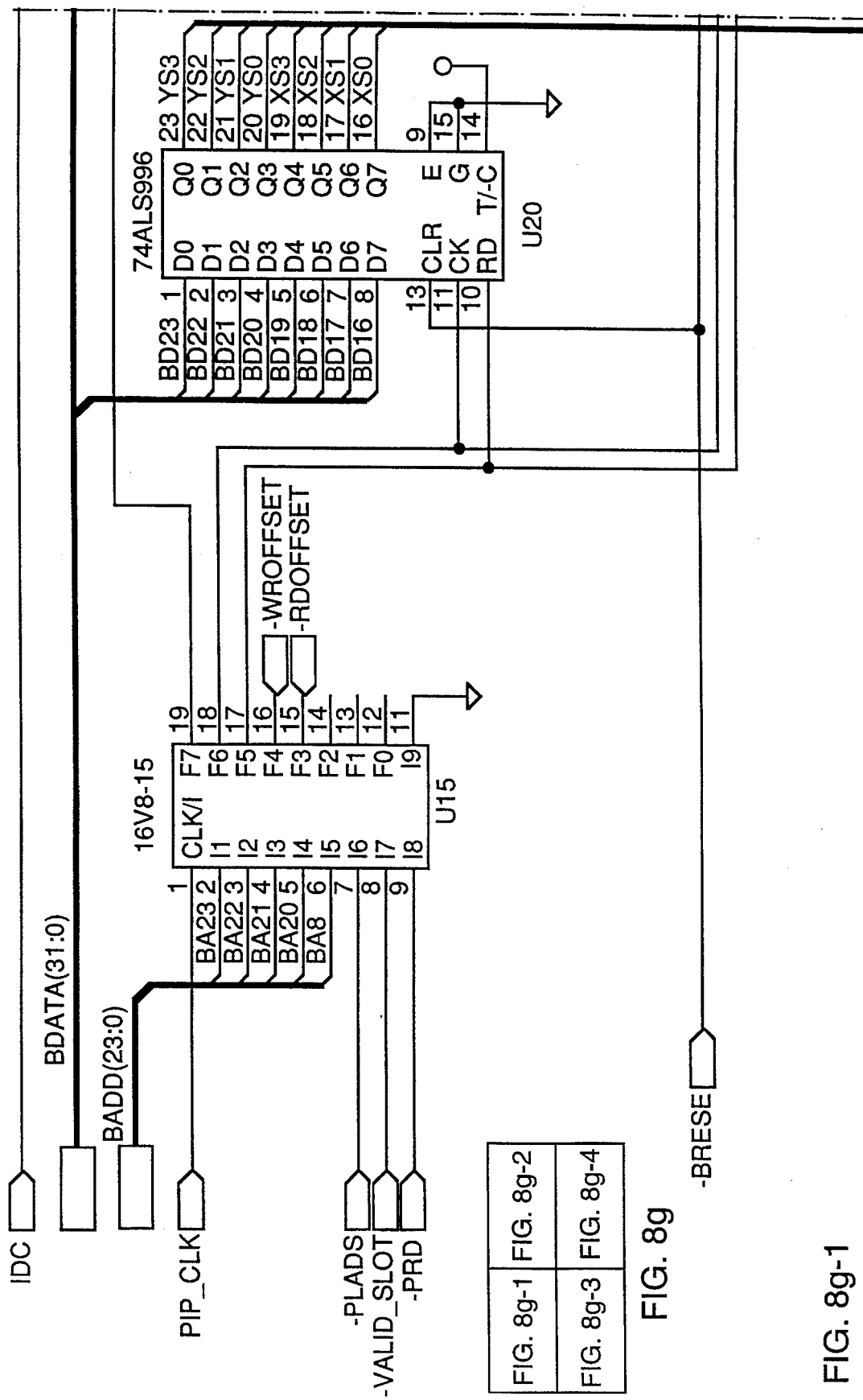
Figures 2, 8G:
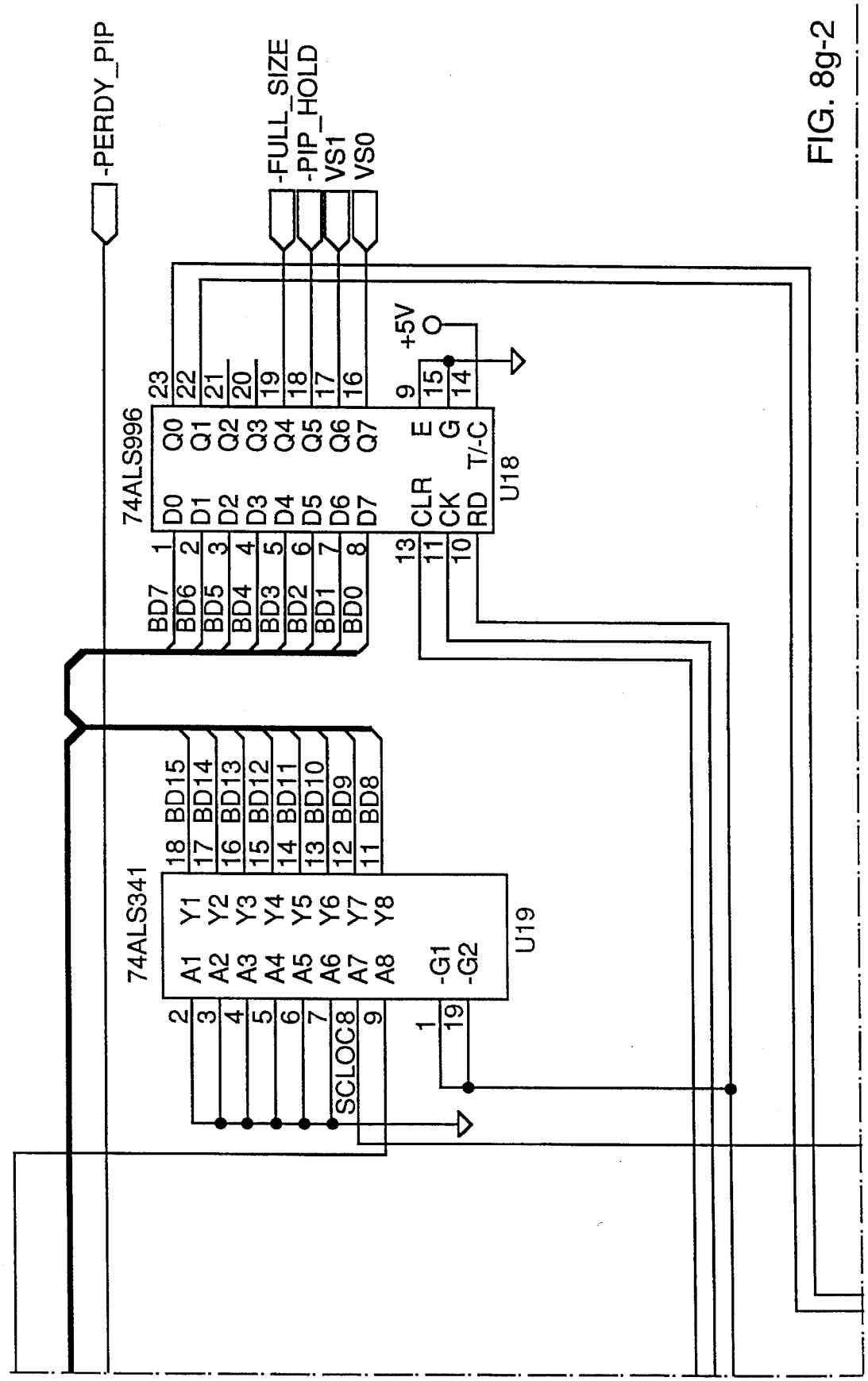
Figures 3, 8G:
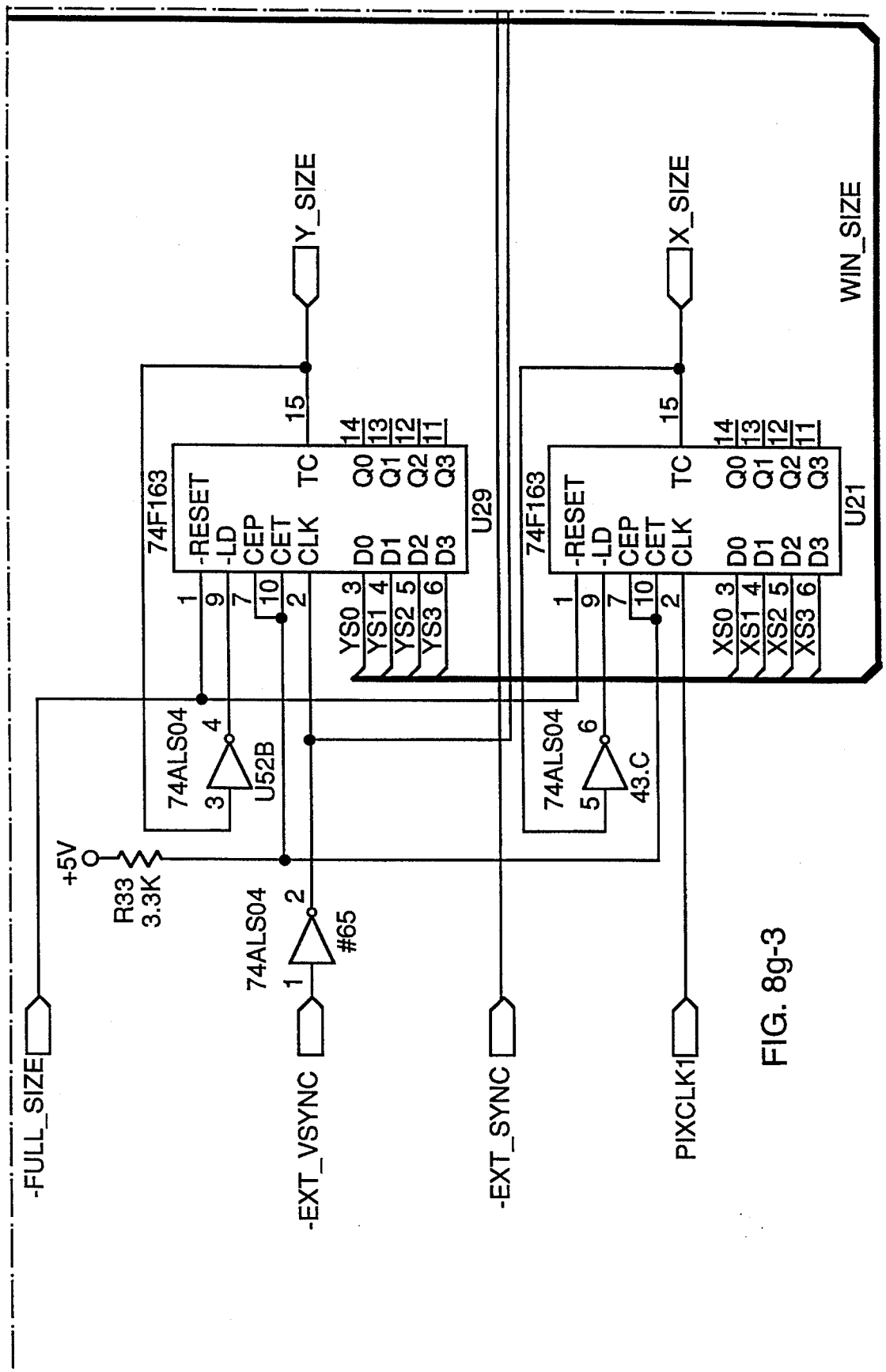
Figures 4, 8G:
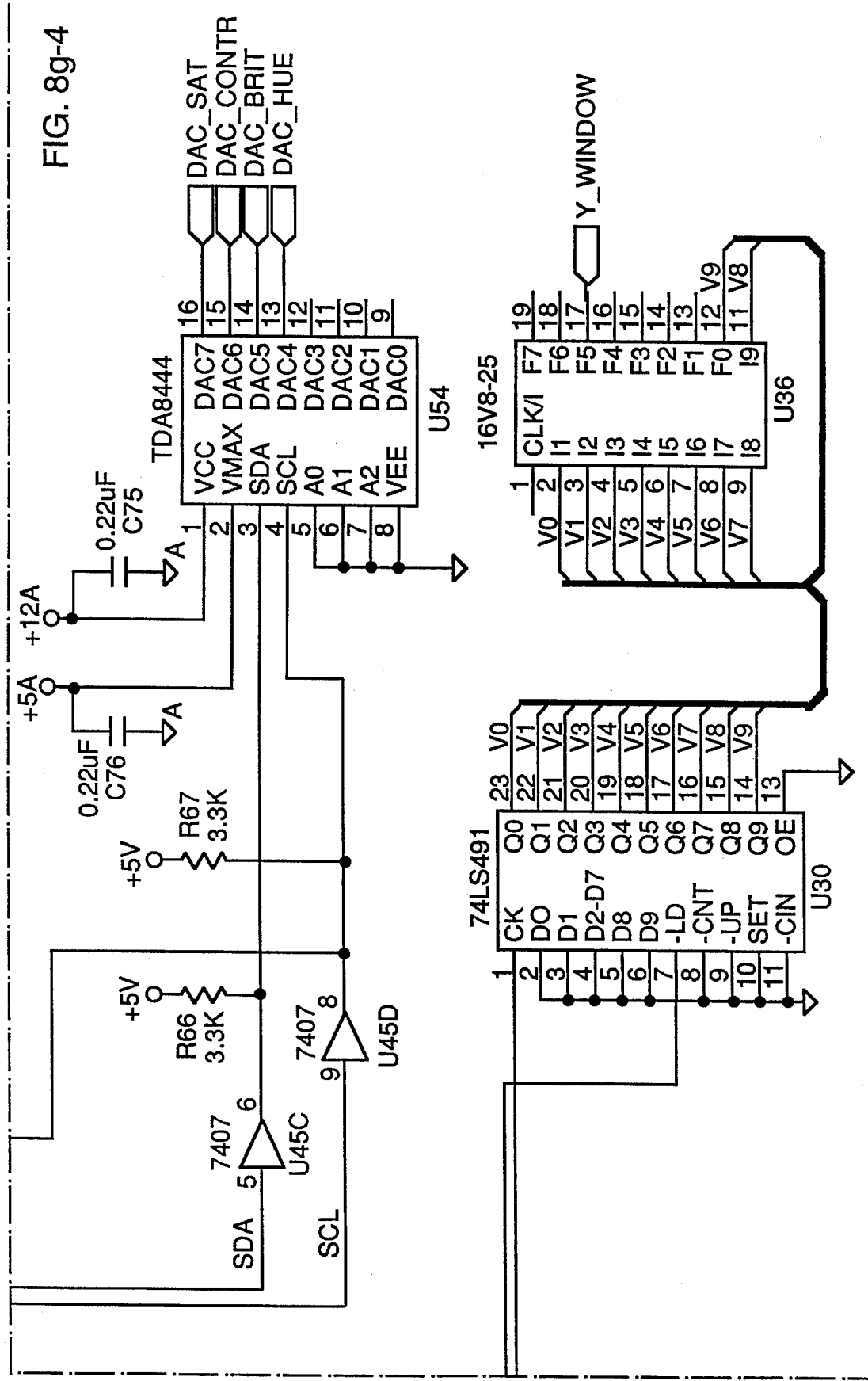
Figures 1, 8H:
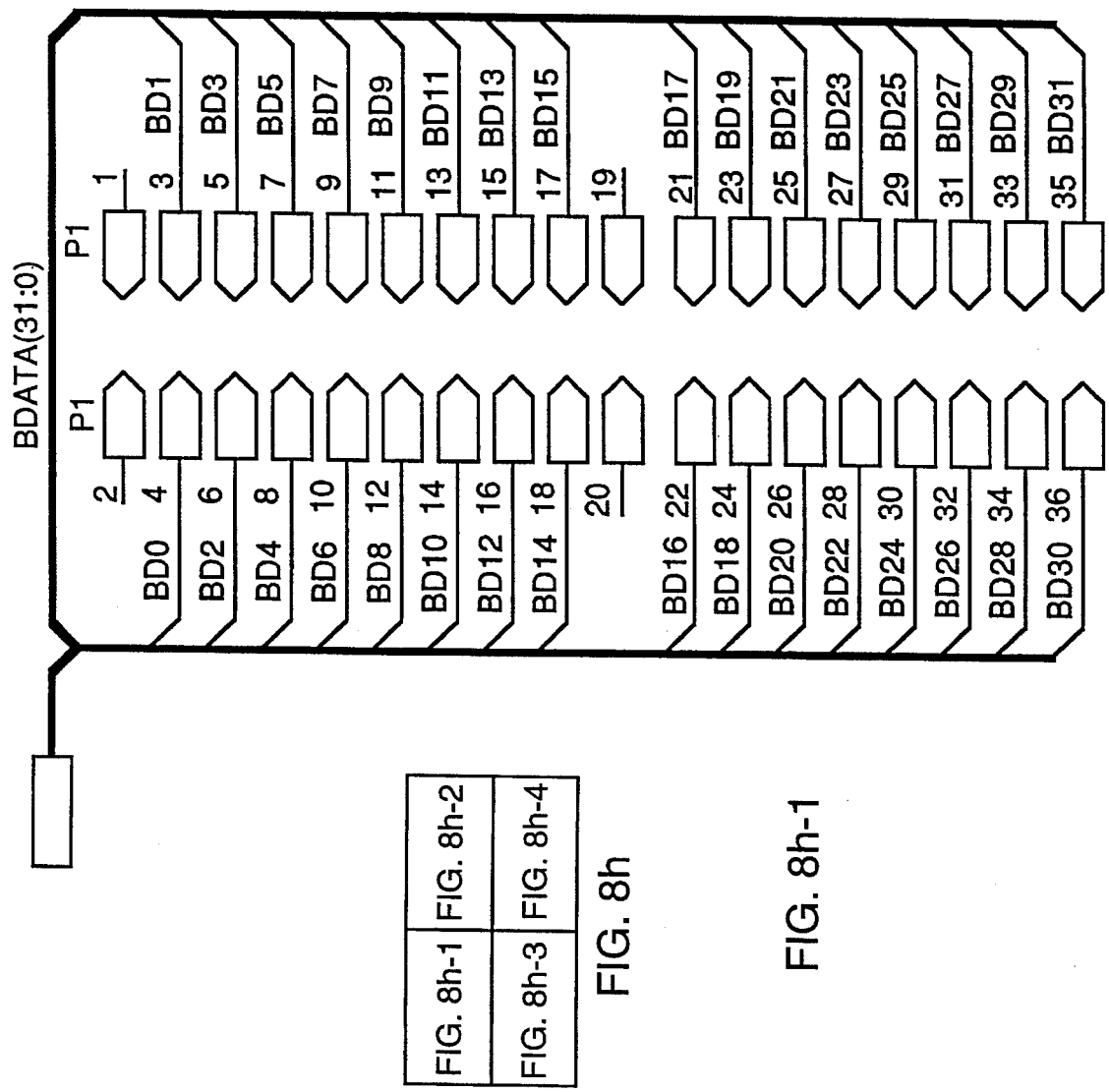
Figures 2, 8H:
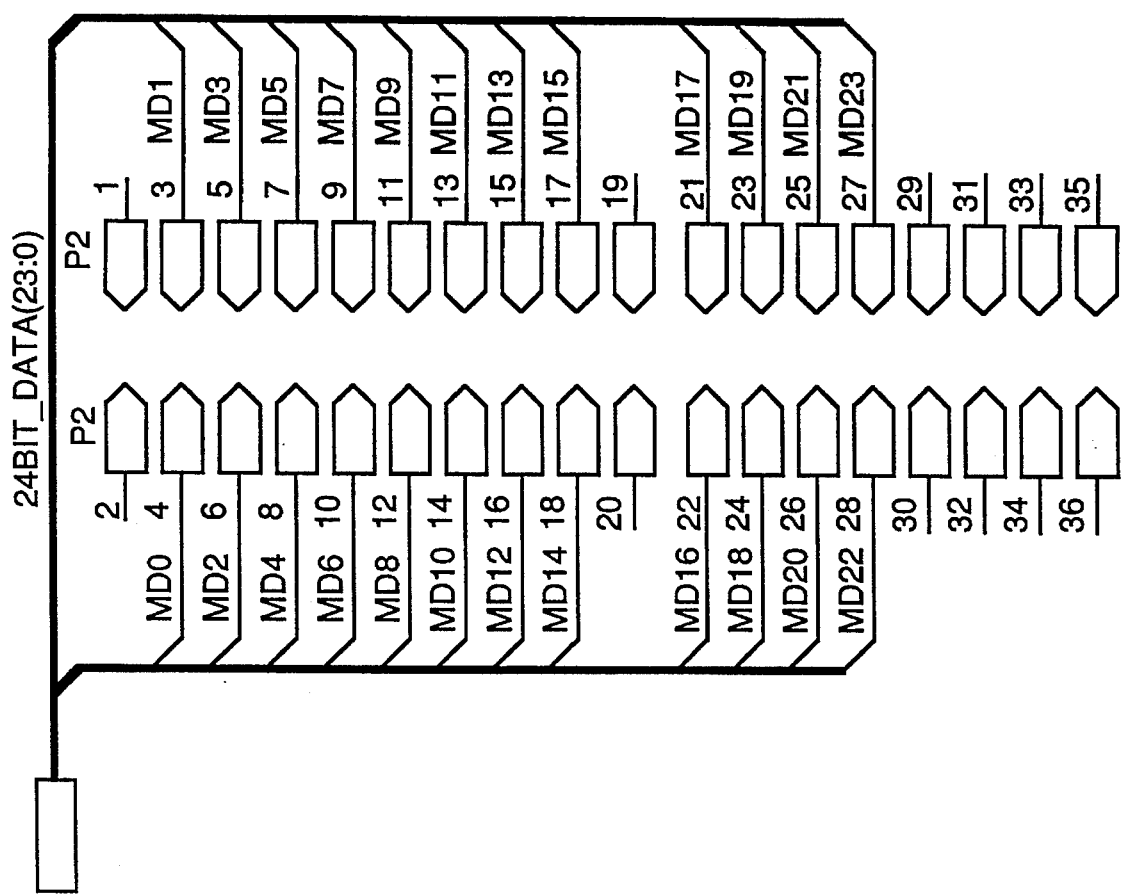
Figures 3, 8H:
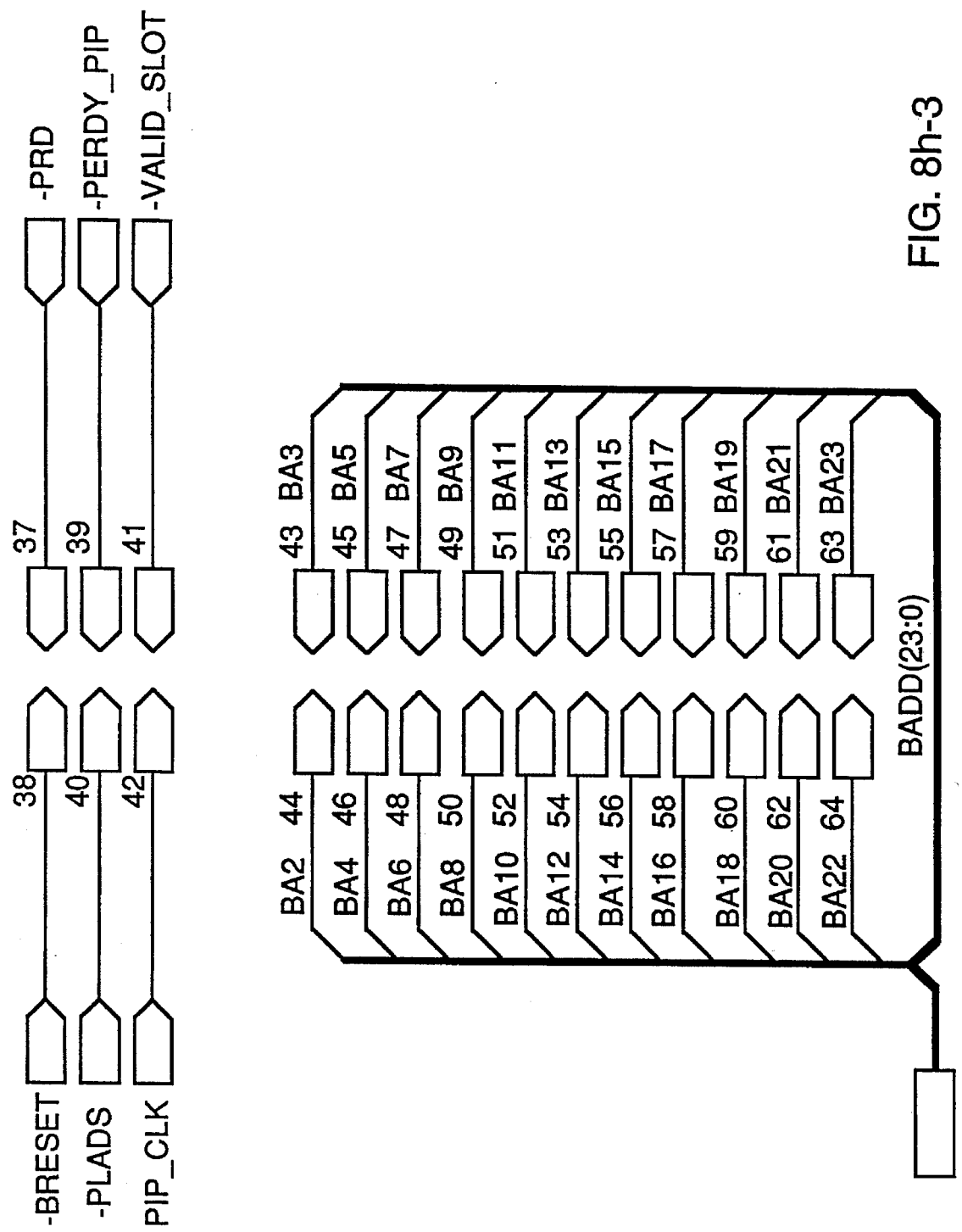
Figures 4, 8H:
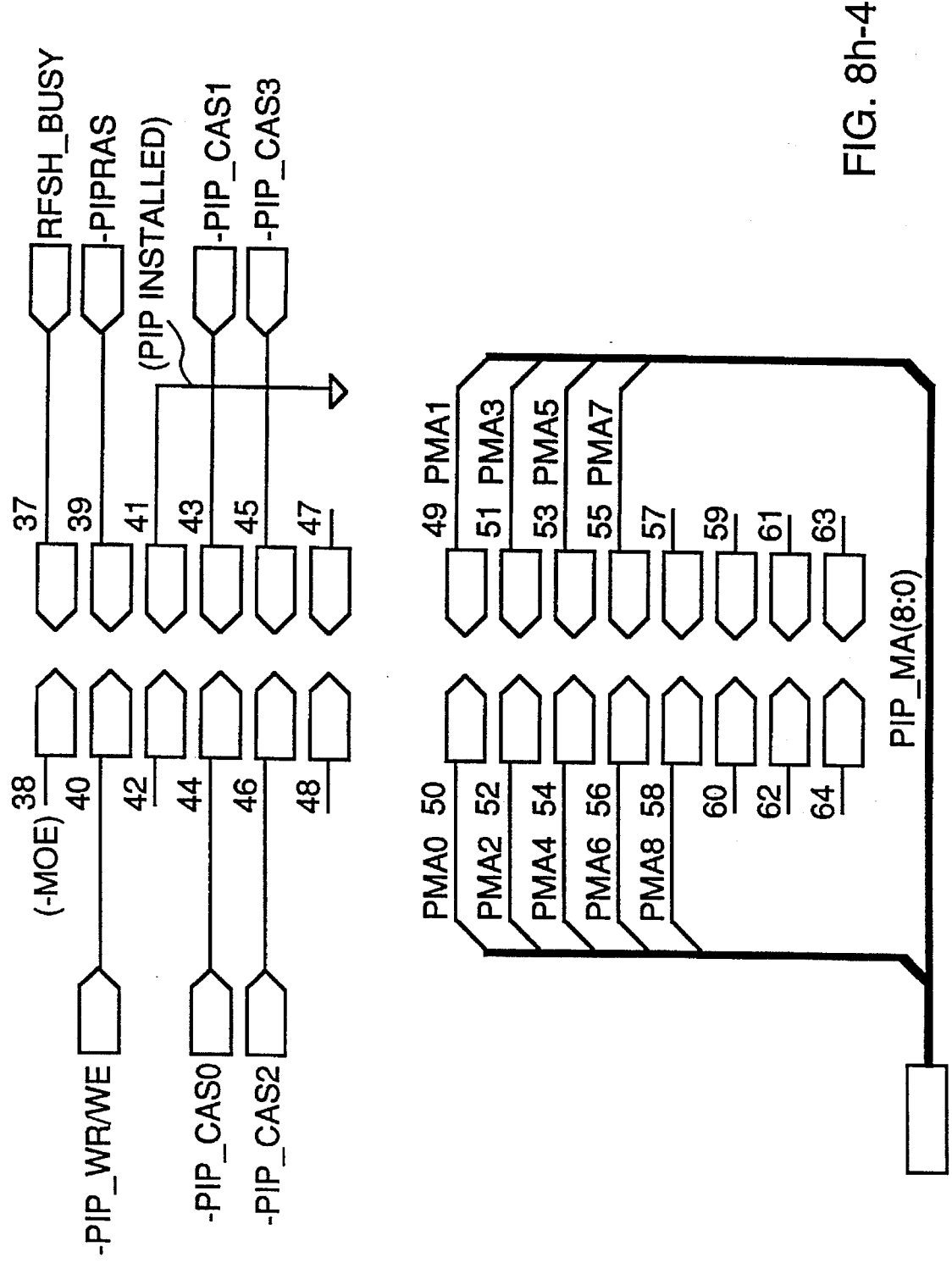
Figures 1, 8I:
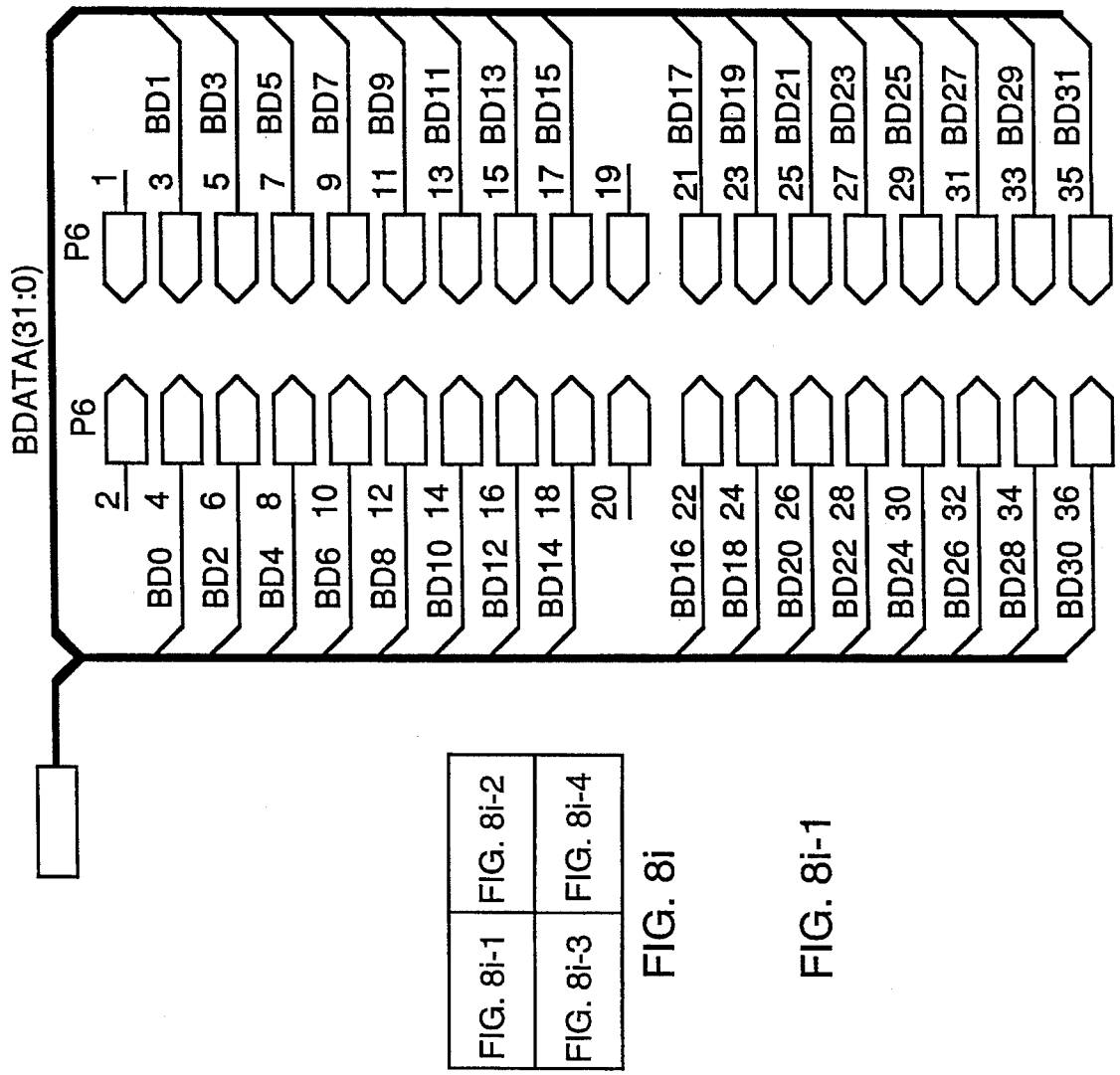
Figures 2, 8I:
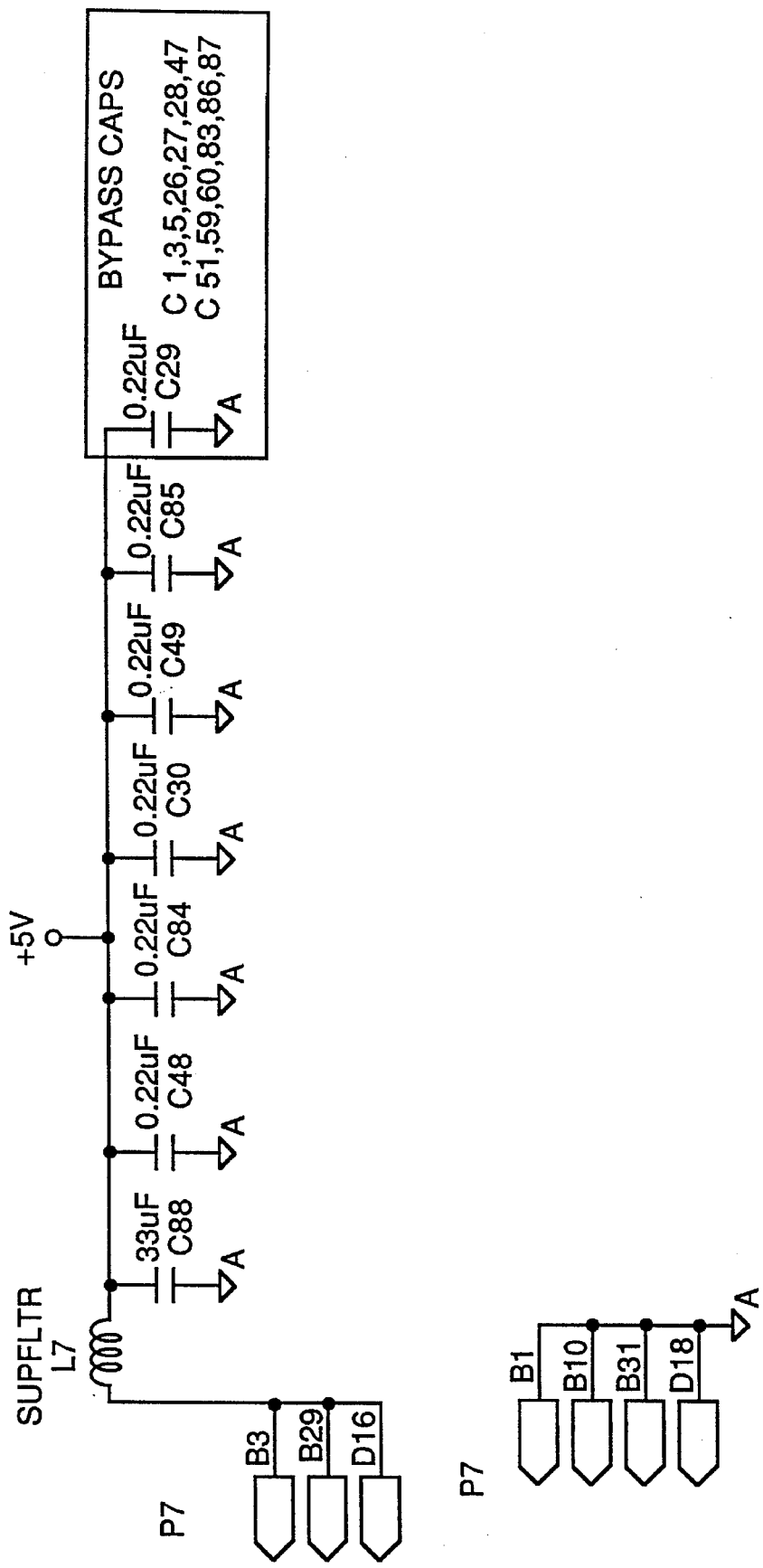
Figures 3, 8I:
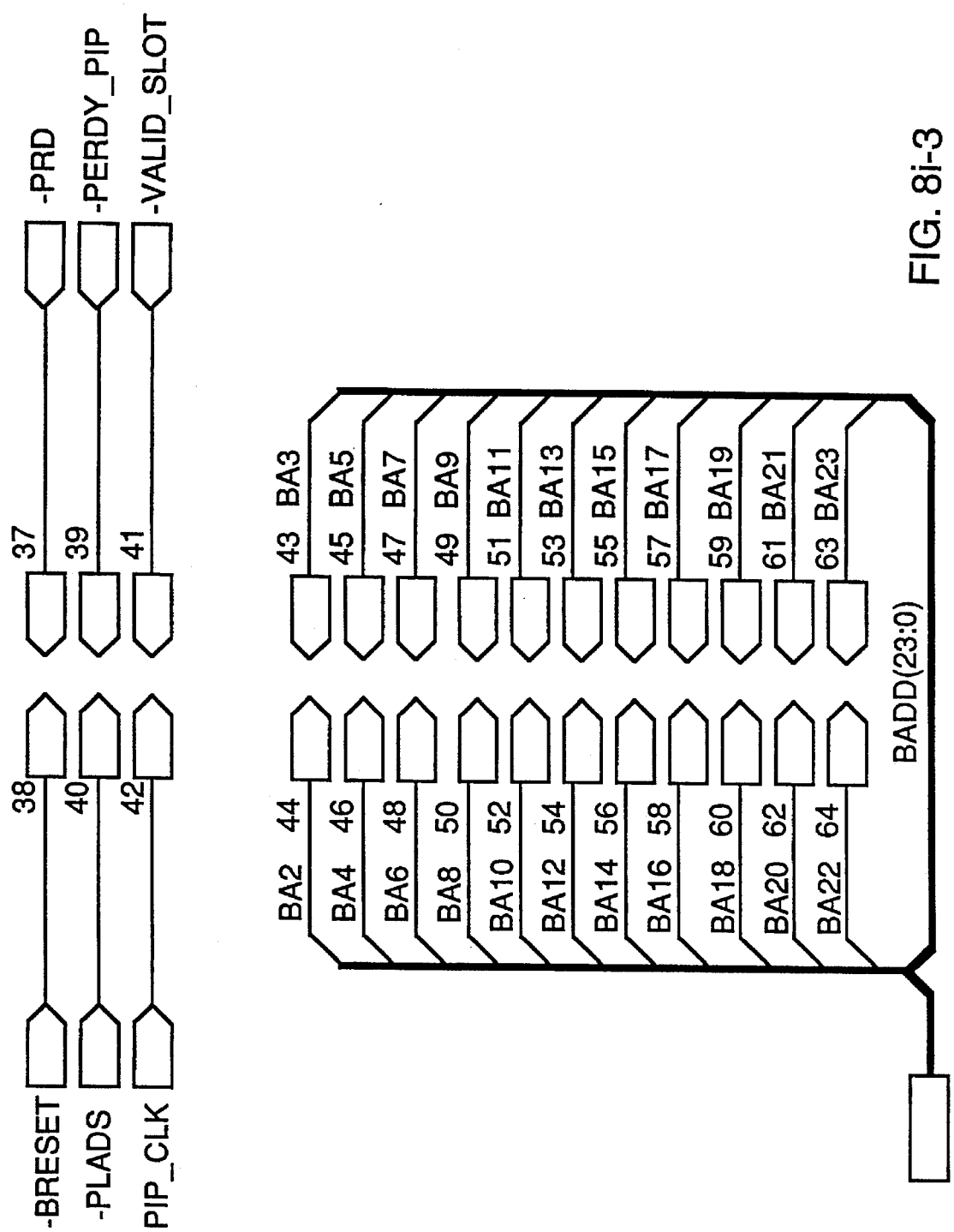
Figures 4, 8I:
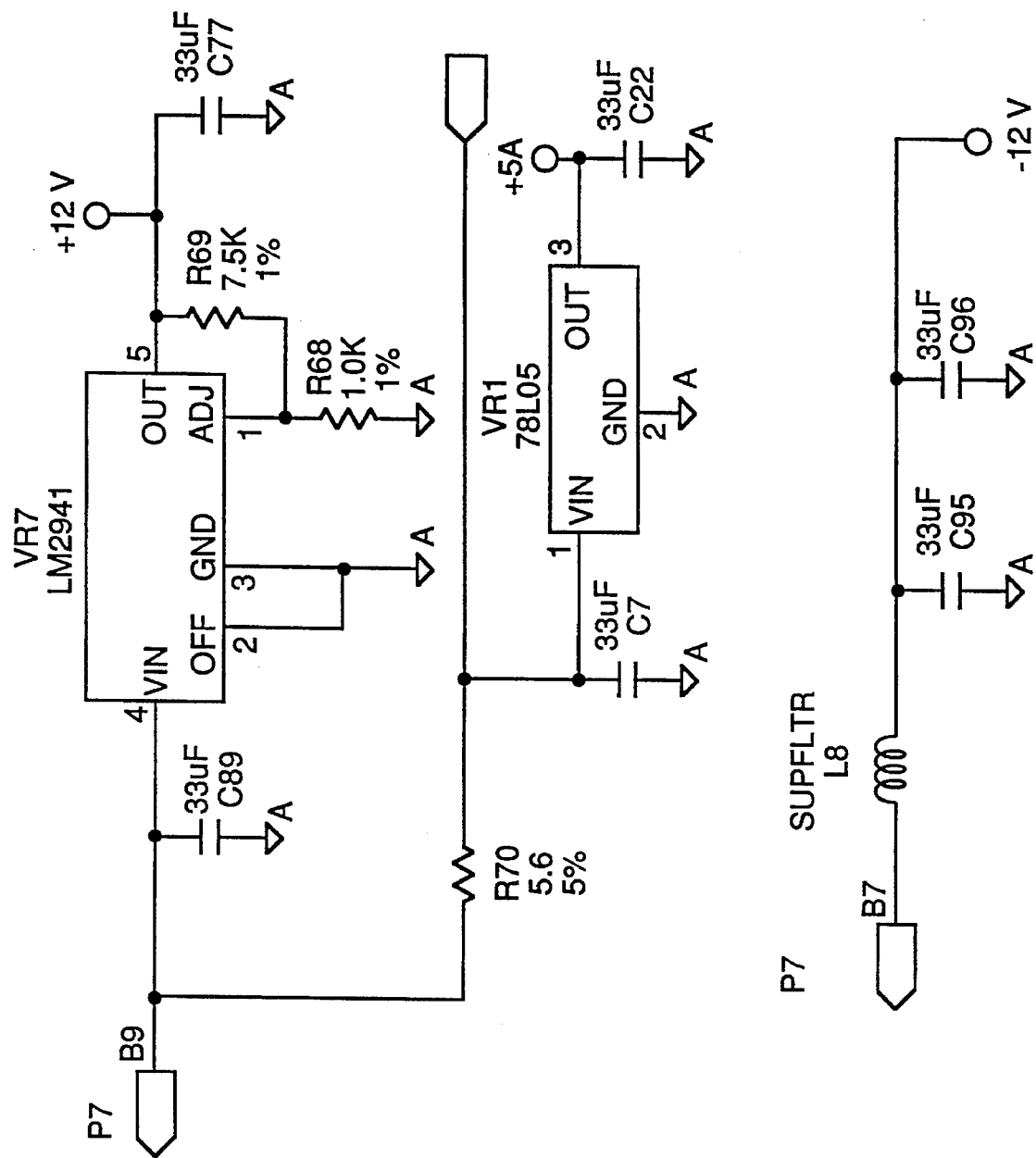
Figure 9:
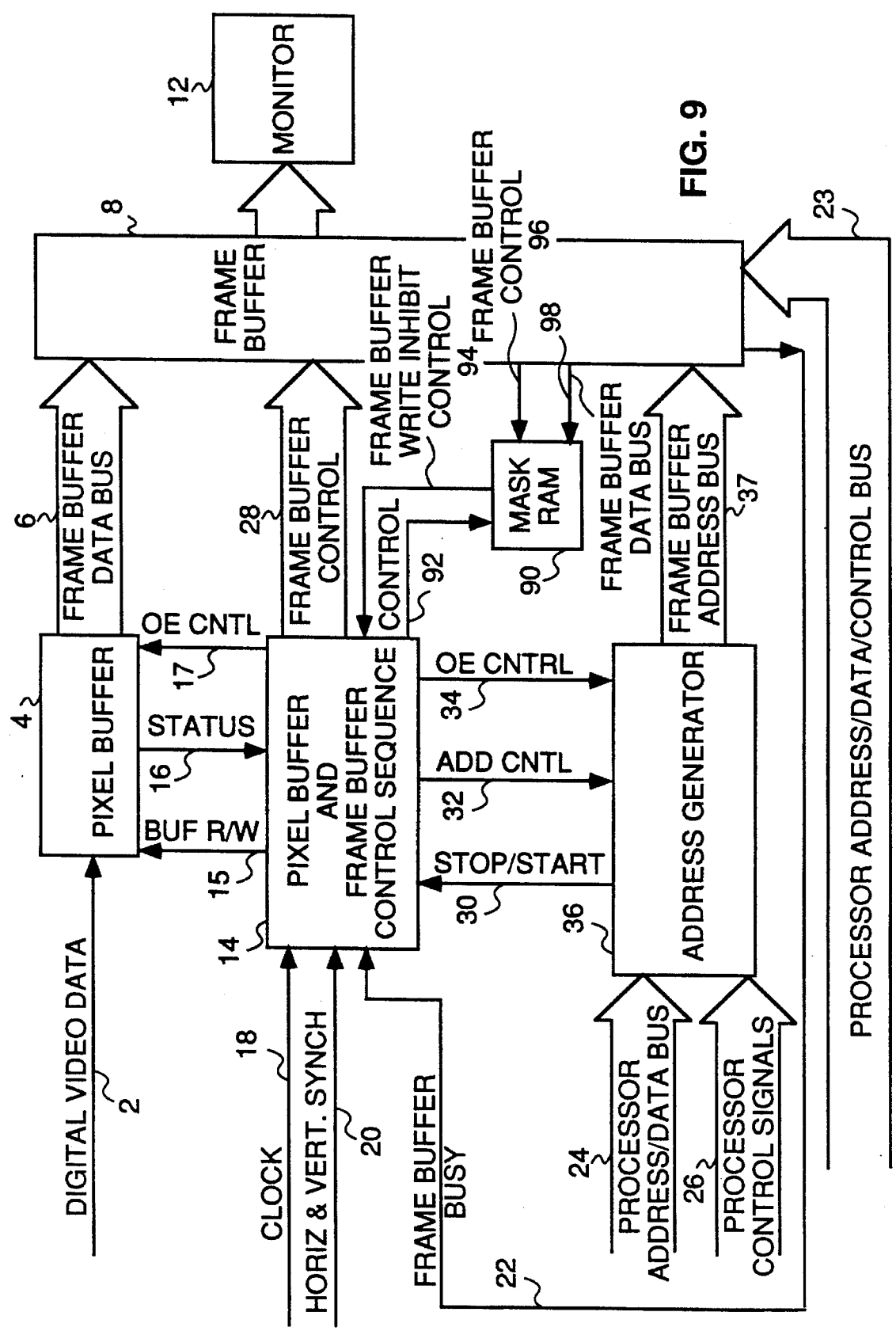

FIGS. 8a to 8i show schematically the embodiment of FIG. 2 implemented in commercially available integrated circuits. FIGS. 8a and 8b show the circuitry of block 46. FIG. 8c shows the circuitry of block 56. FIG. 8d shows the circuitry of blocks 52 and 62. FIGS. 8e, 8f, 8g show the circuitry of block 84. FIGS. 8h and 8i show interface circuitry relating to FIGS. 8a to 8h.

In accordance with another embodiment of the invention, the above described circuitry is implemented in an ASIC format. Each of the blocks 56, 62, and 84 shown in FIG. 2 is implemented in one or more ASIC chips which are manufactured conventionally. The ASIC chips include the same logic circuitry as is included in the integrated circuits and other components shown in FIGS. 8a to 8i. The circuitry may differ in other embodiments. The ASIC chips plus the frame buffer 64 circuitry are preferably surface mounted on a printed circuit board and interconnected. The printed circuit board is preferably of the well-known type which conveniently interconnects with the bus of the host computer.

This disclosure includes copyrighted material. Permission is given for facsimile reproduction of this material, but the copyright owner reserves all other rights.

The above description of the invention is illustrative and not limiting. Further modification to the described embodiments of the invention will be apparent to one of ordinary skill in the art in light of the disclosure and claims appended hereto.

We claim:

1. A converter for converting a video signal from a first data rate to a second data rate, comprising:

a pixel buffer for receiving a portion of the video signal at the first data rate;

an address generator for determining a display location for the video signal;

a non-interlaced raster frame buffer operatively connected to the pixel buffer for receiving the video signal at the second data rate;

a control sequencer operatively connected to the pixel buffer and to the address generator for providing the portion of the video signal stored in the pixel buffer and the display location to the frame buffer upon occurrence of a predetermined event; and means for controlling, in response to a user command, a display size and the display location of the video signal, wherein the display is a window.

2. The device of claim 1, wherein the predetermined event is receipt of a signal indicating a status of the frame buffer.

3. The device of claim 1, further comprising:

a decoder for receiving a plurality of types of analog video signals;

a converter for converting any of the types of analog video signals to a digital signal; and means for providing the digital signal to the pixel buffer.

4. The device of claim 3, wherein the pixel buffer stores the digital signal as twenty-four data bits.

5. The device of claim 1, wherein the means for controlling a display size and location comprises:

means for connecting the converter to a processor; and user interface means operatively connected to the processor for controlling the address generator in accordance with user supplied commands.

6. The device of claim 1, further comprising an oscillator phase locked to a conditional timing signal in the video signal, for providing a timing signal to the control sequencer.

7. The device of claim 1, further comprising means for selectively allowing a host computer to control provision of a second signal to the frame buffer.

8. The device of claim 7, wherein the means for selectively allowing includes storage elements in the frame buffer for receiving the second signal, and wherein the storage elements are operatively connected to video memory elements in the frame buffer.

9. The device of claim 1, wherein the predetermined event is receipt of a control signal from a host computer operatively connected to the control sequencer.

10. A converter for converting scan rates of video signals, comprising:

a pixel buffer for storing a portion of a video signal having a first data rate which is that of an interlaced raster scan;

an address generator for determining a display location for the first video signal;

a non-interlaced raster frame buffer operatively connected to the buffer for receiving video signals at a second data rate differing from the first data rate;

a control sequencer operatively connected to the pixel buffer and to the address generator for providing the portion of the video signal stored in the pixel buffer and the display location to the frame buffer upon receipt of a signal from the frame buffer indicating a status of the frame buffer, and upon receipt of a control signal from a host computer;

means for providing a second video data signal under control of a host computer directly from an external source to the frame buffer; and means for determining whether the video signal or second video data signal is to be provided to the frame buffer at any particular time.

11. A method of converting a scan rate of a video signal comprising the steps of:

storing less than one scan line of the video signal which is received at a first data rate;

providing the stored portion of the video signal to a frame buffer at a second data rate differing from the first data rate, upon occurrence of a predetermined event;

selectively providing, under control of a host computer, a second video data signal from an external source to the frame buffer;

determining a location on a display for the video signal; and providing the portion of the video signal stored in the frame buffer to the display at the predetermined location.

12. The method of claim 11, further comprising, prior to the step of storing, the steps of:

providing a plurality of analog video signals each being of a different television standard; and converting each of the plurality of analog video signals to a digital signal.

13. The device of claim 1, further comprising means for providing to the buffer video signals of any one of a plurality of television standards.

14. A converter for converting a video signal from a first data rate to a second data rate comprising:

a pixel buffer for receiving a portion of the video signal at the first data rate;

an address generator for determining a display location for the video signal;

a frame buffer operatively connected to the buffer for storing the video signal at the second data rate differing from the first data rate;

means for selectively providing, under control of a host computer, a second video data signal from an external source to a port of the frame buffer;

a control sequencer operatively connected to the buffer and to the address generator for providing the portion of the video signal stored in said buffer and the display location to the frame buffer, upon occurrence of a predetermined event; and means for providing the portion of the video signal in the frame buffer to the display at the display location.

15. A device for converting a scan rate of a video signal comprising:

means for storing less than one scan line of the video signal which is received at a first data rate;

a frame buffer;

means for providing the stored data portion in the frame buffer at a second data rate upon occurrence of a predetermined event;

means for selectively providing, under control of a host computer, a second video data signal from an external source to a port of the frame buffer;

means for determining a location on a video display for the video signal; and means for providing the stored portion of the video signal for display at the determined location.

16. The device of claim 14, wherein the second video data signal provided to the frame buffer includes address and control signals from the host computer.

17. The device of claim 10, further comprising means for controlling, in response to a command, a display size and the display location of the video signal, wherein the display is a window.

18. The device of claim 17, wherein the means for controlling comprises:

means for connecting to a processor; and a user interface operatively connectable to the processor for controlling the address generator in accordance with a user command.

19. The device of claim 10, wherein the second video data signal to the frame buffer includes address and control signals from the host computer.

20. The method of claim 11, the step of selectively providing further comprising providing address and control portions of the second video data signal to a port of the frame buffer from the host computer.

21. The device of claim 15, wherein the second video data signal provided to the frame buffer includes address and control signals from the host computer.

22. The method of claim 11, further comprising the step of providing control of the location on the display.

23. The device of claim 10, wherein the raster frame buffer includes a port for receipt of the second video data signal directly from the external source.

24. The device of claim 11, wherein the pixel buffer stores only several pixels of video digital data.

25. The device of claim 1, wherein the pixel buffer stores a maximum of 64 pixels of video digital data.

26. The device of claim 1, wherein the pixel buffer stores less than one video scan line of video digital data.

27. The method of claim 11, wherein the step of storing comprises storing only several pixels of the video signal.

28. The method of claim 11, wherein the step of storing comprises storing a maximum of 64 pixels of the video signal.

* * * * *